US010936490B2

(12) United States Patent
Herdrich et al.

(10) Patent No.: US 10,936,490 B2
(45) Date of Patent: Mar. 2, 2021

(54) SYSTEM AND METHOD FOR PER-AGENT CONTROL AND QUALITY OF SERVICE OF SHARED RESOURCES IN CHIP MULTIPROCESSOR PLATFORMS

(71) Applicant: Intel Corporation, Santa Clara, CA (US)

(72) Inventors: Andrew J. Herdrich, Hillsboro, OR (US); Edwin Verplanke, Queen Creek, AZ (US); Stephen R. Van Doren, Portland, OR (US); Ravishankar Iyer, Hillsboro, OR (US); Eric R. Wehage, Tenino, WA (US); Rupin H. Vakharwala, Hillsboro, OR (US); Rajesh M. Sankaran, Portland, OR (US); Jeffrey D. Chamberlain, Dublin, CA (US); Julius Mandelblat, Haifa (IL); Yen-Cheng Liu, Portland, OR (US); Stephen T. Palermo, Chandler, AZ (US); Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 117 days.

(21) Appl. No.: 15/634,785

(22) Filed: Jun. 27, 2017

(65) Prior Publication Data

US 2018/0373633 A1    Dec. 27, 2018

(51) Int. Cl.
*G06F 12/08*      (2016.01)
*G06F 12/0811*   (2016.01)
(Continued)

(52) U.S. Cl.
CPC ...... *G06F 12/0811* (2013.01); *G06F 9/45533* (2013.01); *G06F 9/45558* (2013.01);
(Continued)

(58) Field of Classification Search
USPC ......................................... 711/130, 152, 163
See application file for complete search history.

(56) References Cited

U.S. PATENT DOCUMENTS

| | | | | |
|---|---|---|---|---|
| 2009/0268738 A1* | 10/2009 | Tchapda | ............. | G06F 13/4022 370/392 |
| 2014/0075118 A1* | 3/2014 | Biswas | ................. | G06F 12/126 711/118 |

(Continued)

*Primary Examiner* — Ilwoo Park
(74) *Attorney, Agent, or Firm* — Nicholson De Vos Webster & Elliott LLP

(57) ABSTRACT

Method and apparatus for per-agent control and quality of service of shared resources in a chip multiprocessor platform is described herein. One embodiment of a system includes: a plurality of core and non-core requestors of shared resources, the shared resources to be provided by one or more resource providers, each of the plurality of core and non-core requestors to be associated with a resource-monitoring tag and a resource-control tag; a mapping table to store the resource monitoring and control tags associated with each non-core requestor; and a tagging circuitry to receive a resource request sent from a non-core requestor to a resource provider, the tagging circuitry to responsively modify the resource request to include the resource-monitoring and resource-control tags associated with the non-core requestor in accordance to the mapping table and send the modified resource request to the resource provider.

30 Claims, 19 Drawing Sheets

(51) Int. Cl.
  *G06F 13/42* (2006.01)
  *G06F 9/455* (2018.01)
  *G06F 9/50* (2006.01)
  *G06F 12/1009* (2016.01)
  *G06F 13/16* (2006.01)

(52) U.S. Cl.
  CPC ........ *G06F 9/5016* (2013.01); *G06F 12/1009* (2013.01); *G06F 13/1663* (2013.01); *G06F 13/4282* (2013.01); *G06F 2009/45583* (2013.01); *G06F 2009/45591* (2013.01); *G06F 2212/283* (2013.01); *G06F 2212/65* (2013.01); *G06F 2213/0026* (2013.01)

(56) References Cited

U.S. PATENT DOCUMENTS

| | | | |
|---|---|---|---|
| 2014/0281192 A1* | 9/2014 | Gilda | G06F 13/16 711/105 |
| 2015/0281099 A1* | 10/2015 | Banavalikar | H04L 12/4633 370/230 |
| 2016/0147655 A1* | 5/2016 | Hower | G06F 12/0846 711/130 |
| 2017/0046202 A1* | 2/2017 | Bao | G06F 9/50 |
| 2018/0129616 A1* | 5/2018 | Liang | G06F 3/00 |
| 2018/0239726 A1* | 8/2018 | Wang | G06F 12/109 |
| 2020/0151111 A1* | 5/2020 | Krueger | G06F 12/0875 |

\* cited by examiner

FIG. 3A

MAPPING TABLE 314A

| SOURCE FIELD | RMID FIELD | CLOS FIELD |
|---|---|---|
| B:D:F[1] | RMID[5] | CLOS[1] |
| B:D:F[7] | RMID[19] | CLOS[8] |
| ... | ... | ... |
| B:D:F[P] | RMID[M] | CLOS[N] |

316A — SOURCE FIELD column
318A — RMID FIELD column
320A — CLOS FIELD column 302-1, 302-2, ..., 302-P

FIG. 3B

MAPPING TABLE 314B

| SOURCE FIELD | INDEX FIELD |
|---|---|
| B:D:F[1] | 0 |
| B:D:F[7] | 1 |
| ... | ... |

316B — SOURCE FIELD
317 — INDEX FIELD

314C

| INDEX FIELD | RMID FIELD | CLOS FIELD |
|---|---|---|
| 0 | RMID[5] | CLOS[1] |
| 1 | RMID[19] | CLOS[8] |
| ... | ... | ... |
| MAX | RMID[M] | CLOS[N] |

319 — INDEX FIELD
318B — RMID FIELD
320B — CLOS FIELD

| MSR OFFSET | MASK VALUE |
|---|---|
| 0 (CLOS[0]) | e.g., 0xFFFF |
| 1 (CLOS[1]) | e.g., 0x00FF |
| ... | ... |
| MAX (CLOS[N]) | e.g., 0xFFFF |

FIG. 5

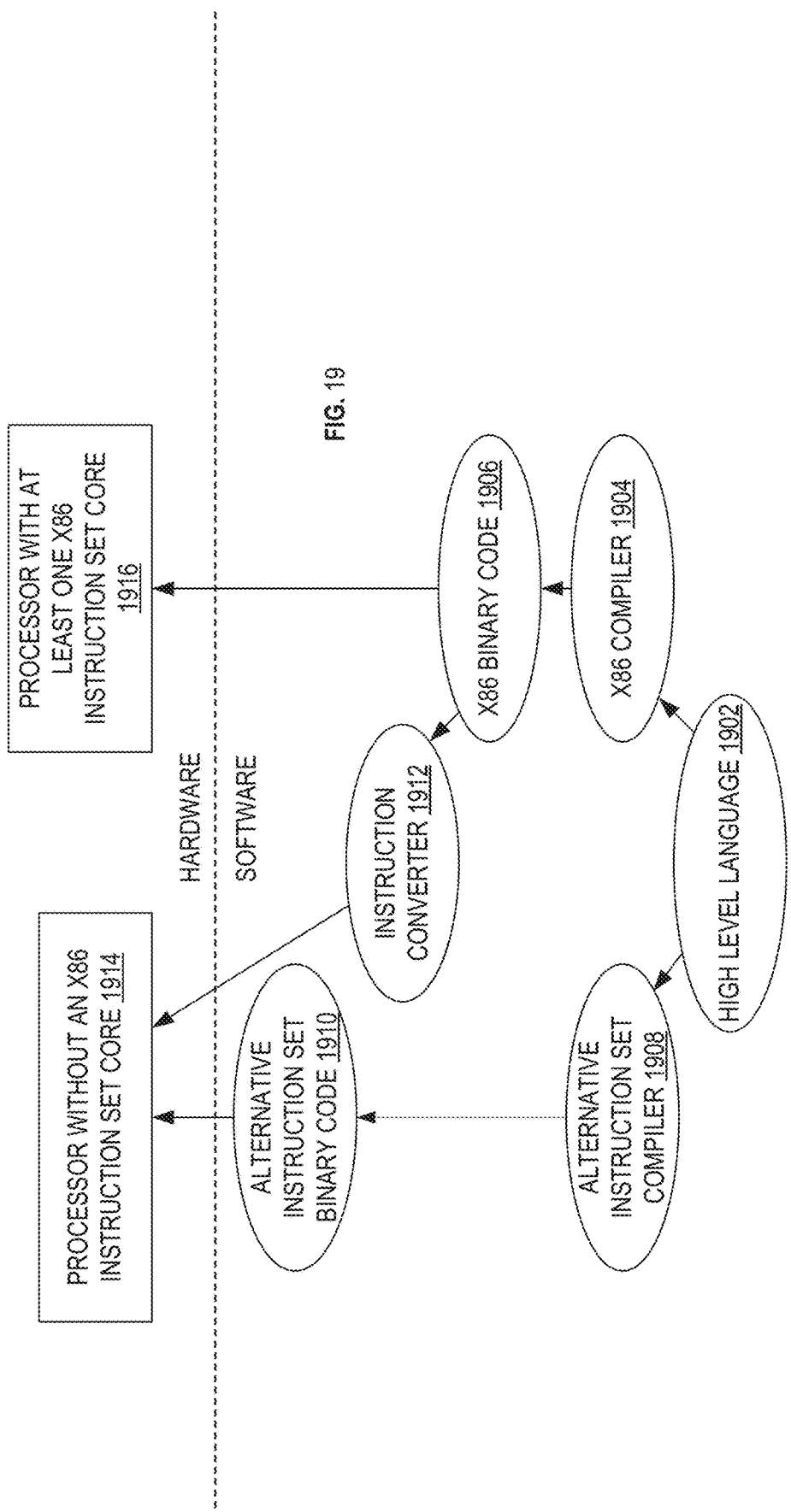

SYSTEM AND METHOD FOR PER-AGENT CONTROL AND QUALITY OF SERVICE OF SHARED RESOURCES IN CHIP MULTIPROCESSOR PLATFORMS

BACKGROUND

Field of the Invention

The various embodiments of the invention described herein relate generally to resource sharing and monitoring in a computer processor or platform.

Description of the Related Art

In Chip Multiprocessor (CMP) platforms, resources such as the last-level cache (LLC) and memory bandwidth are often shared not just among processor cores (cores), but also by non-processor core agents (agents) such as input-output (I/O) devices, integrated accelerators and storage devices. This sharing of resources enables efficient data exchange through the coherent domain between cores and agents. For instance, an agent, such as a PCIe device or network card, may write data to a subset or region of the LLC that can be read by a processor core. By reading and writing directly to the LLC, data exchange between the cores and the agents can be made more efficiently, thereby reducing the pressure on the memory bandwidth. In many usage cases, however, the subset or region of the LLC accessible to the agents is often assigned at a general level (e.g., at the socket level) to all agents. Thus, there is no specific assignment of different regions in the LLC on a per-agent or per-agent-class basis. Consequently, there is little to no control over the amount of cache resources that are available to each agent, not to mention a lack of visibility into the amount of cache each agent is utilizing. Such information is often useful, if not crucial, in diagnosing performance problems.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 3A illustrates an embodiment of a mapping table implementing a direct-mapping scheme;

FIG. 3B illustrates an embodiment of a mapping table implementing an indirect-mapping scheme;

FIG. 5 illustrates a logical view of an embodiment of a directly-mapped CLOS-to-control-mechanism mapping table;

FIG. 19 illustrates a block diagram contrasting the use of a software instruction converter to convert binary instructions in a source instruction set to binary instructions in a target instruction set according to embodiments of the invention.

DETAILED DESCRIPTION

Figure 1:
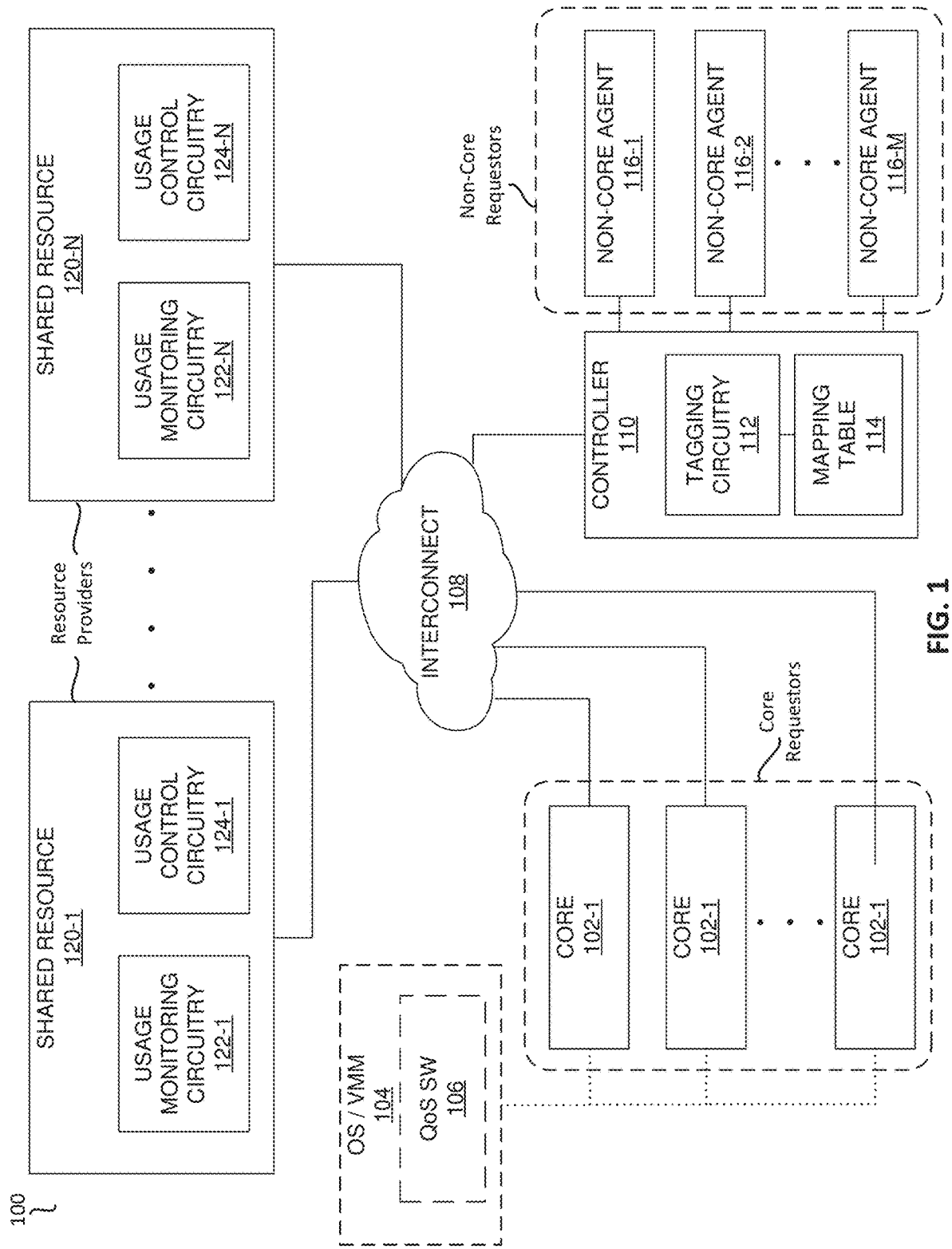
FIG. 1 illustrates a system platform on which embodiments of the invention may be implemented.

Embodiments of system and method for per-agent control and quality of service (QoS) of shared resources in chip multiprocessor platforms is described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

In Chip Multiprocessor (CMP) platforms, resources such as the last-level cache (LLC) and memory bandwidth are often shared not just among processor cores (cores), but also by non-processor core agents (agents) such as input-output (I/O) devices, integrated accelerators and storage devices.

This sharing of resources enables efficient data exchange through the coherent domain between cores and agents. For instance, an agent, such as a PCIe device or network card, may write data to a subset or region of the LLC that can be read by a processor core. By reading and writing directly to the LLC, data exchange between the cores and the agents can be made more efficiently, thereby reducing the pressure on the memory bandwidth. In many usage cases, however, the subset or region of the LLC accessible to the agents is often assigned at a general level (e.g., at the socket level) to all agents. Thus, there is no specific assignment of LLC regions on a per-agent or per-agent-class basis. What this also means is that there is little to no control over the amount of cache resources that are available to each agent. Not to mention a lack of visibility into the amount of cache each agent is utilizing, which is information that is often useful, if not crucial, when diagnosing performance problems.

Aspects of the invention enable the monitoring and control over usage of shared resources by the agents, by tagging each agent request with a resource-monitoring and/or a resource-control tag. Embodiments of the resource-monitoring tag and resource-control tag include the resource monitoring identification (RMID) and class of service (CLOS) tags utilized by Intel Corporation of Santa Clara, Calif. While the RMID and CLOS tags are referenced throughout this specification, one skilled in the arts understands that other forms of tags could also be used. In some embodiments, a single tag may be used to provide the same or similar functionalities as having separate resource-monitoring and resource-control tags.

Through the use of resource-control and resource-monitoring tags like RMID and CLOS as intermediate abstractions, a great deal of flexibility is provided. For example, Resource utilization by the agents can be monitored and/or controlled individually, in groups, or in classes. According to an embodiment, a request with a CLOS tag that is associated with one group of agents, such as network interface cards (NICs), may be prioritized over requests tagged with CLOS tags associated with groups, like solid-state storage devices (SSDs). Moreover, in one embodiment, the amount of shared resource used by NICs may be distinguished from that of the SSDs, based on the RMID associated with each resource request. This allows the resources used by NICs and SSDs be separately tracked.

Figure 2A:
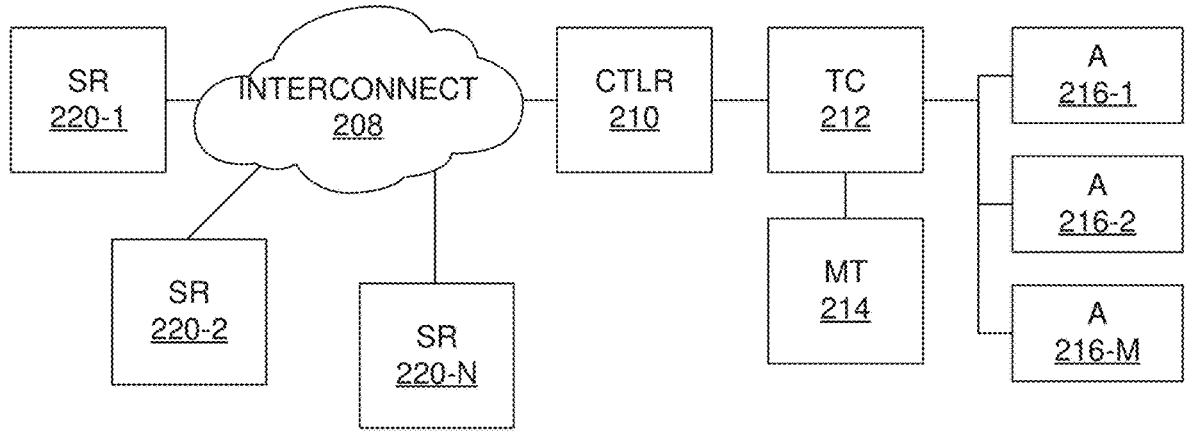
FIG. 2A-2C illustrate different configurations of the system platform according embodiments of the invention.
Figure 2B:
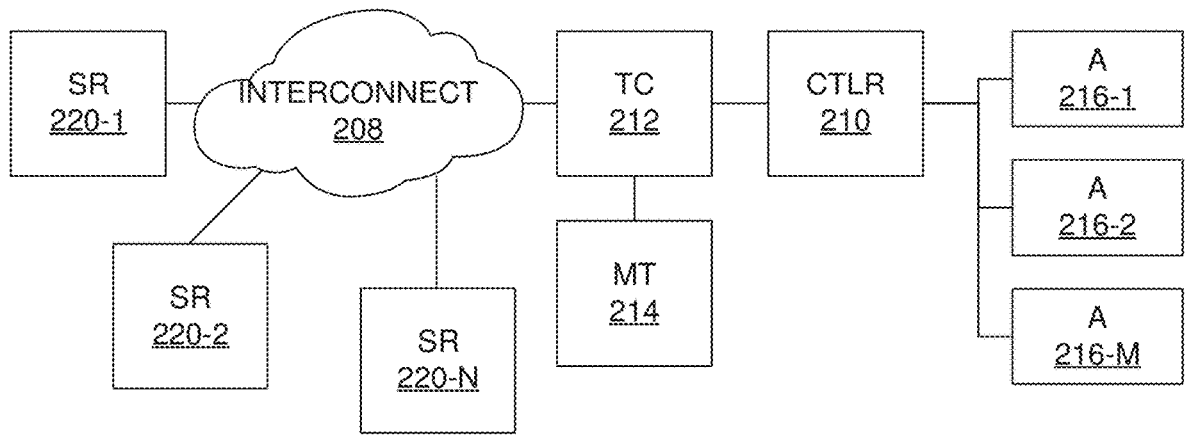
Figure 2C:
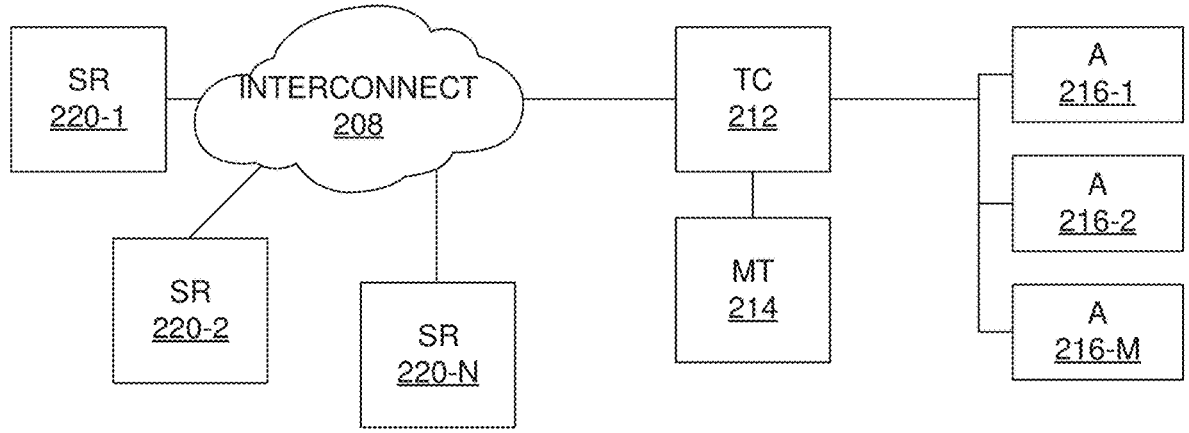

FIG. 1 illustrates a system platform on which embodiments of the present invention may be implemented. System 100 includes one or more processor cores 102-1~102-P and one or more non-core agents 116-1~116-M. The processor cores and the non-core agents may request shared resources from resource providers 120-1~120-N. The processor cores may be referred to as core requestors and the non-core agents may be referred to as non-core requestors. A few examples of the non-core agents include input-output (I/O) devices, graphics cards/accelerators, field-programmable gate arrays (FPGAs), and/or storage devices. The cores, non-core agents, and shared resources are communicatively and/or operatively connected to an interconnect. The interconnect may be implemented as point-to-point connections, a mesh, a ring, as well as other suitable structures. According to an embodiment, the non-core requesters are connected to the interconnect through a controller 110, which may include a tagging circuitry/logic 112 and a mapping table 114. While the tagging circuitry 112 and mapping table 114 are shown as part of the controller 110, they may be implemented as independent units that are separate from the controller. Conversely, although shown as separate units in FIG. 1, the tagging circuitry 112 and mapping table 114 may be implemented as a single unit in some embodiments. According to an embodiment, the tagging circuitry 112 and mapping table 114 may be implemented anywhere along the path between the shared resources and the non-core requestors, so long as the identifying information for each non-core requestor is available. FIGS. 2A-2C illustrate several exemplary implementations of the system platform. These examples are merely a subset of all the possible implementations that are available and are not intended to be limiting. In FIG. 2A, the tagging circuitry 112 and the mapping table 114 are implemented in the path between the controller 110 and the non-core requestors 116. In FIG. 2B, the tagging circuitry 112 and the mapping table 114 are implemented in the path between the controller 110 and the interconnect 108. In FIG. 2C, the tagging circuitry 112 and the mapping table 114 are implemented in place of the controller, between the interconnect 108 and the non-core requestors 116. According to an embodiment, the tagging circuitry 112 may function as the controller.

Referring to FIG. 1, the controller 110, or the tagging circuitry 112 if there is no controller, may receive and process resource requests sent by the non-core requestors. The controller 110 or the tagging circuitry then forwards the processed requests onto the interconnect 108 to be delivered to one or more resource providers that are the intended recipients. The controller 110, such as an input-output memory management unit (IOMMU) in some embodiments, may perform context swap on the resource request, by translating the addresses in the resource request from the address space of the non-core requestor (e.g., virtual addresses) into addresses in the shared resource's address space (e.g., physical addresses). As part of processing the resource requests, according to an embodiment, the tagging circuitry 112 tags each received resource request with a resource monitoring identification (RMID) and/or a class of service identification (CLOS). In one embodiment, the tagging circuitry 112 modifies the received resource request to include the RMID and/or the CLOS by appending them to the request. In one embodiment, before the tagging is performed, the tagging circuitry 112 needs to first query the mapping table 114 to determine the appropriate RMID and/or CLOS with which to tag the request. The mapping table 114, according to an embodiment, includes a plurality of mapping entries, each of which includes one or more source fields that comprise values useable to uniquely identify the source or sender of the resource request (i.e., the resource requestor). In addition, each mapping entry also includes an RMID field and/or a CLOS field to store, respectively, the RMID and CLOS tags that are associated with the source or sender of the request. According to an embodiment, the RMID and CLOS tags are numeric values assigned by software. The tags may be used to identify a single requestor or a group/class of requestors. For instance, each requestor may be assigned a unique RMID and/or a unique CLOS. Alternatively, a single RMID or CLOS may be assigned to multiple requestors.

In addition to the non-core requestors, according to an embodiment, the core requestors also request resources from the resource providers. Each resource request sent by the core requestors is tagged with the RMID and/or CLOS associated with the sending core requestor. Examples of a core requestor include a core, a thread executing on the core, a context subsystem on the core, or any other identifiable units associated with a core whose shared resource usage is to be monitored or controlled. The RMID and/or CLOS tags used by core requestors and non-core requestors may be drawn from the same pool of tags or from different pools.

For instance, there may be a global pool of RMID tags that may be utilized by both the core and non-core requesters. In such scenarios, according to an embodiment, the RMID tags that may be used to tag requests from core requestors do not overlap those used for non-core requestors. In other scenarios, the core requestors and the non-core requestors may each have their own separate pool of RMID and CLOS tags. Depending on the implementation, some RMID and CLOS tags for the core requestors may overlap those of the non-core requestors. If such is the case, implementation of additional mechanisms for distinguishing and processing duplicative RMID and CLOS tags may be required.

Referring still to FIG. 1, each of the resource providers 120-1~120-N that participate in the control and monitoring of shared resources further includes a usage monitoring circuitry 122 and a usage control circuitry 124. Upon receiving a resource request tagged with RMID, the usage monitor circuitry 122 responsively track the resources used in fulfilling the resource request under that RMID. The usage information tracked may include the type and quantity of the resources used, the time spent on processing the request, as well as any other usage data that are of interest.

For a resource request tagged with CLOS, the usage control circuitry 124 may prioritize the execution of the request with respect to other requests based on the CLOS tags of each request. The usage control circuitry 124 may also limit the resource that are available to fulfill the request based on the CLOS tag of the request.

As noted above, the RMID and CLOS tags may be numeric tags assigned by software. These tags are stored in mapping table 114 that is communicatively and operatively coupled to the tagging circuitry 112. FIG. 3A illustrates an embodiment of a mapping table 314A that includes a plurality of mapping entries 302-1~302-P. Each of the mapping entries includes a source field 316A, an RMID field 318A, and a CLOS field 320A. According to the embodiment illustrated in the FIG. 3A, a PCIe Bus/Device/Function identifier (B:D:F) which uniquely identifies the source or the sender of the resource request is stored in the source field 316A. While a single source field is shown per mapping entry for storing the B:D:F identifier, multiple source fields may be used, depending on the implementation. For instance, instead of a single source field, the mapping entry could alternatively include a bus field, a device field, and a function field to store the corresponding information.

The mapping table illustrated in FIG. 3A is an example of a direct mapping scheme in which each mapping entry includes the identifier of the resource requestor as well as the associated RMID and CLOS. Alternatively, the mapping table may be implemented using an indirect mapping scheme. As illustrated in FIG. 3B, each entry in the mapping table 314B that implements the indirect mapping scheme replaces the RMID and CLOS fields from the direct mapping scheme with an index field 317. The value stored in the index field 317 is then used in a second table 314C to look up the RMID and CLOS associated with the index value. The secondary table 314C includes an index field 319, an RMID field 318B, and a CLOS field 320B. The indirect mapping approach allows that RMID/CLOS fields to scale without being limited by the size of the mapping table or table entries.

While the embodiments illustrated in FIGS. 3A and 3B show fields for both RMID and CLOS, it is not a requirement that both RMID and CLOS be implemented. For instance, in some embodiments, only the RMID is store in the mapping table and tagged by the tagging circuitry in the resource request. In other embodiments, only the CLOS is implemented.

According to an embodiment, the value stored in the source field of the mapping table to uniquely identify the resource requestor is a physical address space identification (PASID). In contrast with the B:D:F identifier described above, the PASID identifies a compute context within a device rather than just the device itself.

Figure 4:
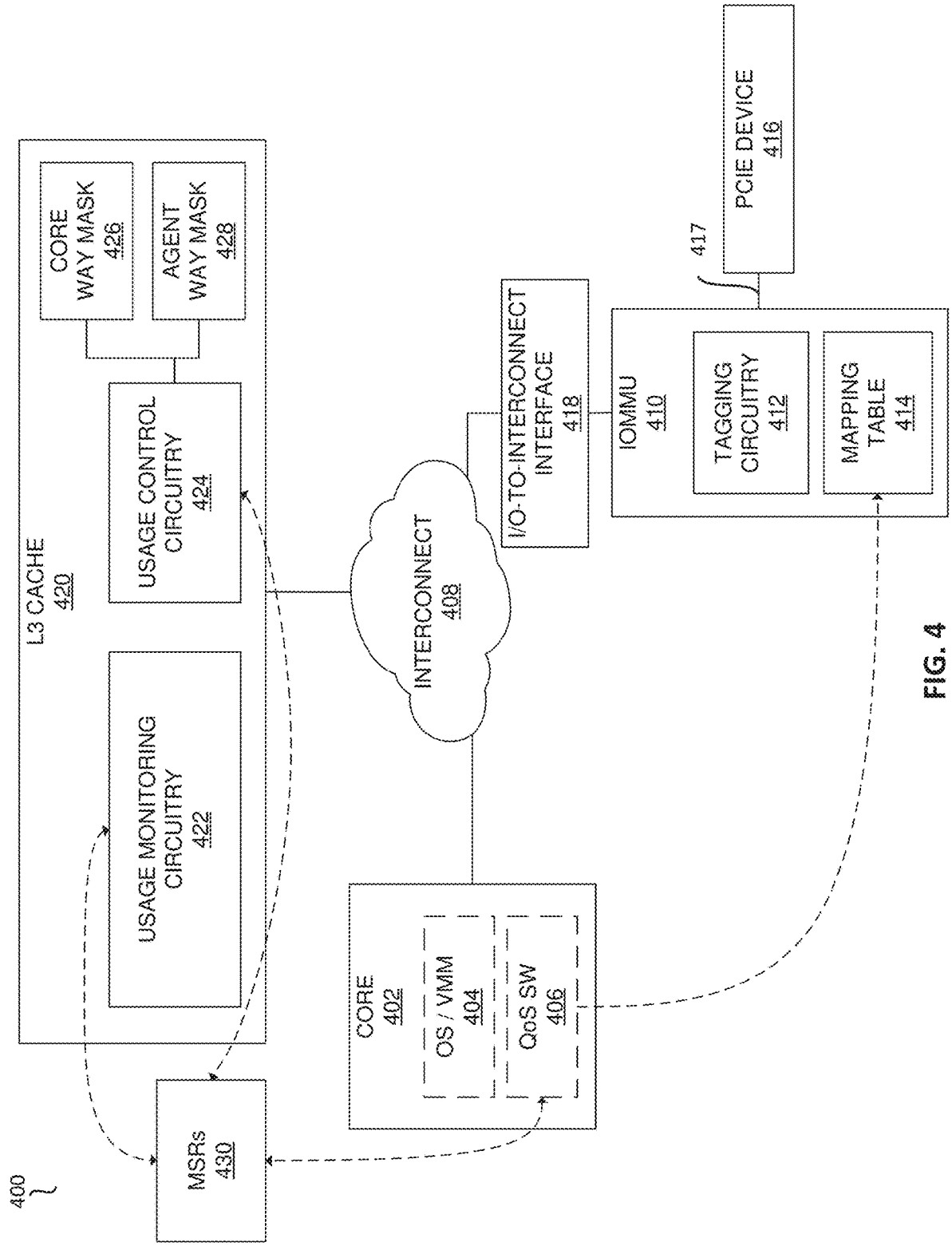
FIG. 4 illustrates an embodiment of a platform for tagging resource requests from a PCIE device to a level 3 (L3) cache.

FIG. 4 illustrates an embodiment of a platform for tagging cache requests from a PCIe device to the level 3 (L3) cache or last level cache (LLC). While the hardware platform illustrated in FIG. 4 is focused on the sharing of the L3 cache by cores and non-core agents, the present invention is applicable to any shared resource in the hardware platform.

Platform 400 includes a processor core 402, a PCIe device 416, and a L3 cache 420. The core 402, PCI-e device 416, and L3 cache 420 are communicatively and/or operatively connected through an interconnect 408. The interconnect 408 may be implemented as point-to-point connections, mesh, ring, or any other suitable configurations. According to the embodiment, the PCIe device 416 is connected to the interconnect through an input/output memory management unit (IOMMU) 410 and an input-output (I/O) to interconnect interface 418. The IOMMU may further include a tagging circuitry 412 and a mapping table 414.

According to an embodiment, the PCIe device 416 sends a read or write request to the IOMMU 410 along with a unique identifier by which the IOMMU is able to track requests made from specific PCIe endpoints. In one embodiment, the unique identifier is a Bus/Device/Function (B:D:F) address tag. The PCIe device 416 is uniquely identified by its B:D:F address in the PCIe configuration space. The PCIe configuration space may enumerate standard details such as the memory-mapped IO (MMIO) ranges and base address register (BAR) addresses of the PCIe device 416, thereby enabling the PCIe device 416 to conduct memory-mapped communications with threads executing on the core 402.

In cases with shared virtual memory (SVM), the PCIe device 416 may make cache-coherent requests. Specifically, requests generated by the PCIe device 416 on the PCIe bus 417 are translated by the IOMMU 410 from logical addresses to physical addresses based on the B:D:F address of the PCIe device 416 and the preconfigured address space mappings. During this address translation process, the IOMMU 410 may look up the RMID and CLOS tags associated with the PCIe device 416 in the mapping table 414 and append or attach them to the outgoing requests. In one embodiment, the lookup and the attachment of RMID/CLOS tags is done by the tagging circuitry 412. Next, the tagged outgoing requests are sent to the IO-to-interconnect interface 418, which may perform additional functions such as range checking and tag validation to ensure that the requests are proper for the intended destinations (e.g., the L3 cache). After the additional functions are performed by the IO-to-interconnect interface 418, the resulting requests are routed through the interconnect 408 and delivered to the L3 cache 420.

The L3 cache 420, when processing and fulfilling the tagged requests, may use the RMID tags to track resource usage, such as counting the cache lines that are in use by the PCIe device 416. The L3 cache 420 may also utilize the CLOS tags to restrict resource usage, such as restricting the PCIe device 416 to only a subset of the cache or a limited range of cache lines.

According to an embodiment, the usage monitoring circuitry 422 may track any useful metric, such as the number of cache lines in use, based on different RMIDs. A system software, such an operating system (OS) or virtual machine manager (VMM) 404 running on the core 402, may utilize a software interface (e.g., quality of service software interface 406) to access the tracked metrics and to monitor and/or determine the resource usages by querying different RMIDs. With respect to the example illustrated in FIG. 4, in addition to cache usage, the monitoring mechanism also allows memory bandwidth to be tracked. For instance, by tracking the number of L3 cache misses attributed to requests tagged with particular RMID, one would be able to determine the memory bandwidth being consumed by the requestor or requestors associated with that RMID. According to an embodiment, the tracked metrics may further include event codes and/or counters for different memory types, such as fast DRAM or slower persistent memory technologies, to provide additional monitoring details.

According to an embodiment, the monitoring of resource usage by the I/O devices, such as PCIe device 416, coexist with existing monitoring mechanism(s) that are in place for the processor core 402. In one embodiment, the tracking of cache use by the core 402 and by the PCIe device 416 may be jointly conducted by a single usage monitoring circuitry 422. Requests from the core 402 and from the PCIe device 416 may be tagged with RMID tags from the same RMID tag pool. Alternatively, separate pools of RMID tags may be maintained, one for tagging requests from processor cores (e.g., core 4) and one for tagging requests from non-core agents (e.g., PCIe device 416). In addition to separate RMID pools, separate usage-monitoring circuitries may also be implemented. According to an embodiment, each of the monitoring circuitries corresponds to a specific RMID pool, and only processes the RMID tags from its corresponding RMID pool.

According to an embodiment, the usage control circuitry 424 may control and restrict resource usage based on the CLOS tag associated with each resource request. For example, core way mask 426 and agent way mask 428 each includes a mask that can restrict the region or cache lines that new cache lines may be allocated into. When the incoming resource request is tagged with a CLOS tag that is associated with a core requestor, the core way mask 426 is used. On the other hand, if CLOS tag is associated with a non-core requestor, then the agent way mask is used. By choosing different way masks for different CLOS tags, the usage control circuitry 424 control the subsets or regions of the cache that can be used to fulfill each resource request. While way masks are utilized in FIG. 4, other types of control and enforcement mechanisms, such as probabilistic control, may be used to accommodate different shared resource types.

Similar to the monitoring mechanism described above, the resource control mechanism can coexist with existing control mechanism(s) that are in place for the processor core 402. In the embodiment illustrated in FIG. 4, the usage control circuitry 424 can restrict the cache resources available to fulfill requests from both the core 402 and the PCIe device, by applying different way masks based on CLOS tag in the request. Requests from the core 402 and the PCIe device 416 may be tagged with CLOS tags from the same CLOS tag pool. Alternatively, separate pools of CLOS tags may be maintained, one for tagging requests from processor cores (e.g., core 402) and one for tagging requests from non-core agents (e.g., PCIe device 416). In addition to separate CLOS pools, separate usage control circuitries may also be implemented. Each of the control circuitries corresponds to a different CLOS pool, as well as a set of one or more way masks. Each of the control circuitries processes only the CLOS tags from its corresponding CLOS pool and applies only its corresponding set of way masks.

To put in another way, the RMID/CLOS tags used to tag the resource requests can either be drawn from a common global pool (shared between core and non-core requestors), or from special pools designed to keep core and non-core requestors separate. In one embodiment, the RMID tags may be drawn from the same RMID pool while the CLOS tags are drawn from separate CLOS pools. In other embodiments, the reverse is true.

In FIG. 4, the OS/VMM 404, as well as the software running thereon, may interact and use the monitoring and control features described above through the QoS software interface 406. In one embodiment, only a subset of software (e.g., privileged software) running on the OS/VMM 404 can access these features through QoS software interface 406.

In some embodiments, a set of model-specific registers (MSRs) 430 is implemented or utilized to serve as a CLOS-to-control-mechanism mapping table for storing the mapping of CLOS tags to control mechanisms. In one embodiment, the control mechanisms comprise of different way masks. Similar to the mapping of requestor to RMID/CLOS tags illustrated in FIGS. 3A and 3B, the CLOS-to-control-mechanism mapping table may utilize a direct-mapping scheme or an indirect-mapping scheme. FIG. 5 illustrates a logical view of an embodiment of a directly mapped CLOS-to-control-mechanism mapping table, with way masks serving as the control mechanism. According to the embodiment, each CLOS tag is to indicate a position in a MSR in which a corresponding way mask is stored. For instance, the CLOS tag may indicate an offset into a particular MSR. As illustrated in FIG. 5, a mask value 0x00FF is stored in the MSR at offset CLOS[1]. This mask value (0x00FF) is used by the usage control circuitry 424 to restrict the region of L3 cache that is available for fulfilling resource requests having the "CLOS[1]" tag. To control and adjust the shared resources that are available to each of the CLOS tags, the OS/VMM 404, or the software running there on, may simply modify the CLOS-to-way-mask mapping table, by changing the way mask associated with a CLOS tag. In one embodiment, the modifications are made through the QoS software interface 406.

Figure 6:
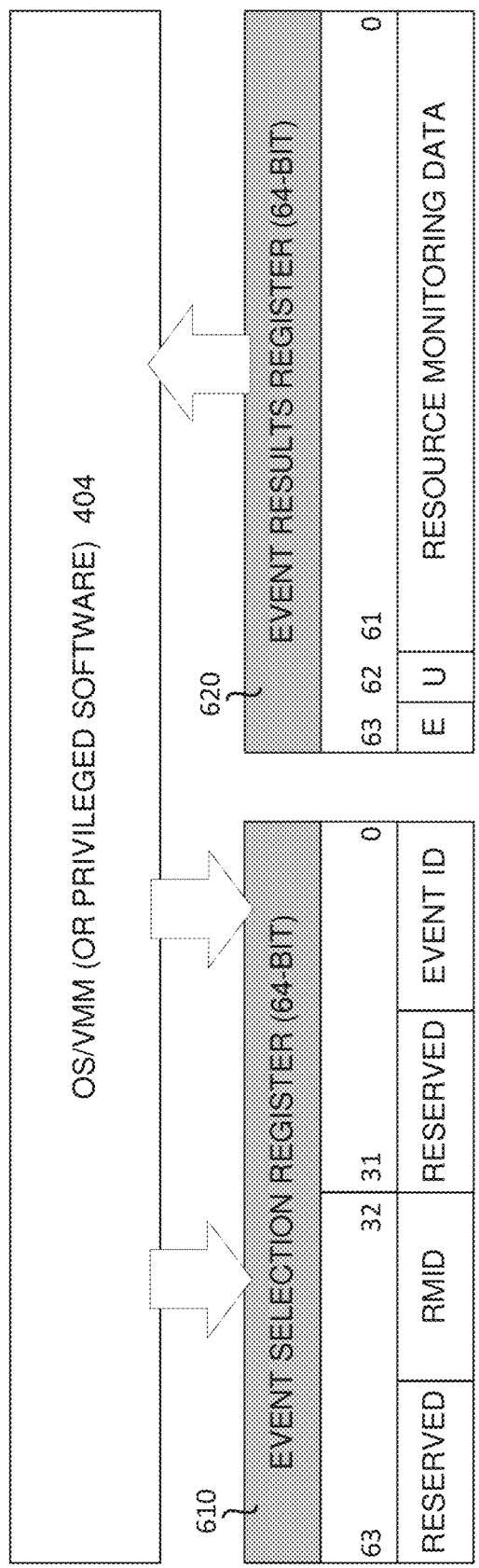
FIG. 6 illustrate an embodiment of the mechanism for retrieving monitored metrics.

In addition to serving as a mapping table, registers in the MSRs 4 30 may also be used to access monitored metrics tracked by the usage monitoring circuitry 422. FIG. 6 illustrate a pair of registers—event selection register 610 and event results register 620—that are used for retrieving monitored metrics in accordance to an embodiment. The event selection register 610 and event results register 620 may be part of MSR 430, or alternatively, be specially implemented registers. In one embodiment, the event selection register 610 is the IA32 QM EVTSEL MSR and the event results register 620 is the IA32 QM CTR MSR.

To retrieve the monitored metrics tracked by the usage monitoring circuitry 422, the OS/VMM 404, or software running thereon, writes a request for metrics to the event selection register 610. In one embodiment, the request for metrics include an RMID tag and an event identification (ID). The event ID may be used to specify or filter the metrics that are to be retrieved for a given RMID. According to an embodiment, the monitoring circuitry 422 back monitors the event selection register 610 for any changes made. In another embodiment, the event selection register 610 is monitored by another hardware which responsively signals the monitoring circuitry 422 upon detecting writes to the register.

In response to a metrics request, the monitoring circuitry 422 writes the requested resource monitoring data, along with any other pertinent information, to the event results register 620. In one embodiment, other pertinent information may include the state of the metrics request, such as whether or not it has been processed or whether an error has occurred during its fulfillment. After the requested monitoring data has been written to the event results register 620, it can be retrieved by the OS/VMM 404 by access that register.

In one embodiment, if the RMID tags are shared between the core and non-core requestors, such that the RMID tags from the core and non-core requestors are drawn from the same RMID tag pool, a single pair of registers (i.e., event selection register 610 and event results register 620) may be used to retrieve monitored metrics. However, if the RMID tags for the core and non-core requestors are drawn from different pools of RMID tags, such that some of the RMID tags for core requestors may overlap those for non-core requestors, separate pairs of the event selection and event results registers may be implemented for each of the RMID tag pools. In some embodiments, new event IDs may be used to distinguish between the overlapping RMID tags.

Figure 7:
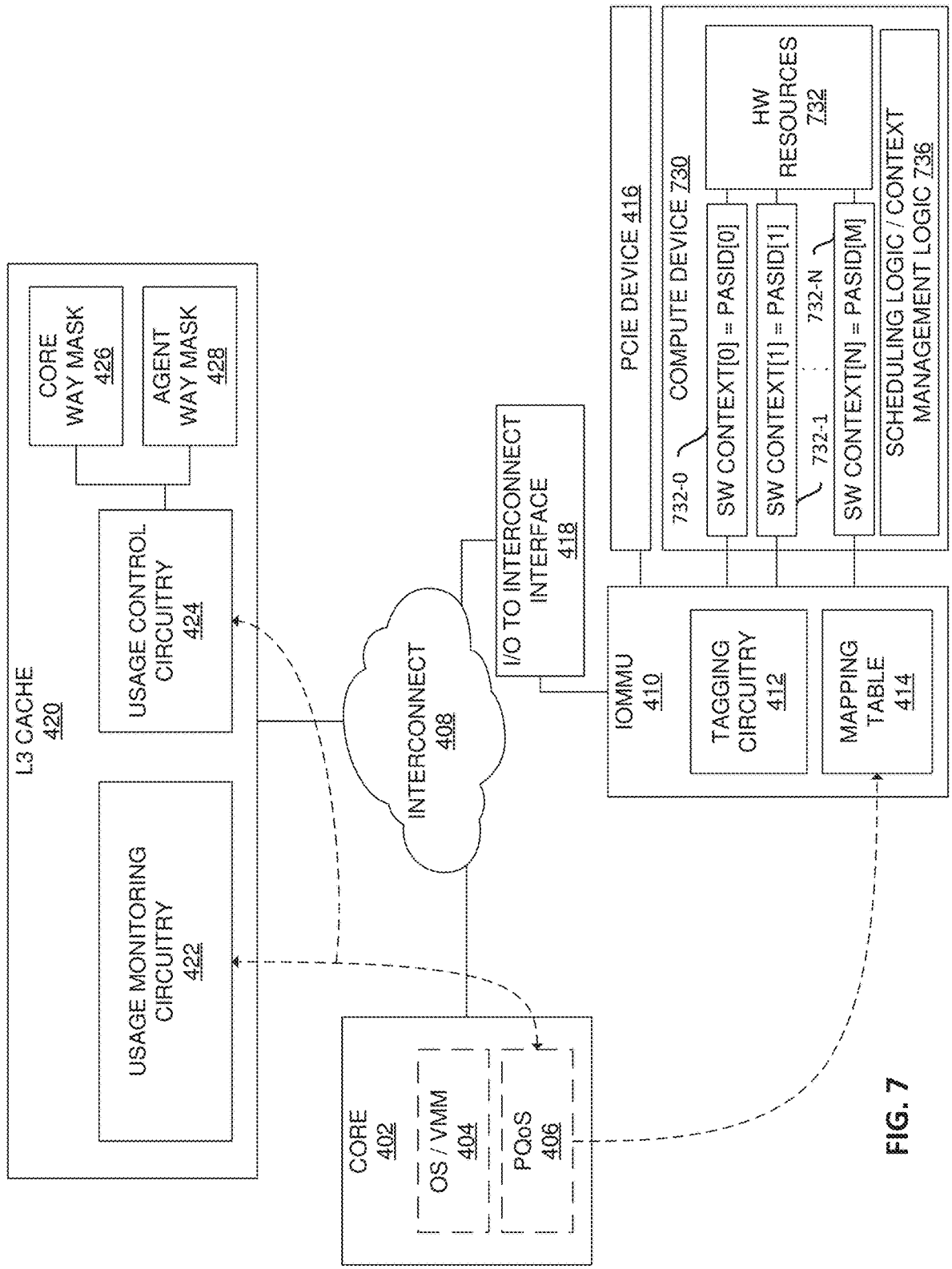
FIG. 7 illustrates an embodiment of a platform on which tagging based on physical address space identification (PASID) may be implemented.

As mentioned above, the tagging of RMID and CLOS may be based on a device context by using physical address space identification (PASID). FIG. 7 illustrates an embodiment of a platform on which PASID-based tagging may be implemented. The platform illustrated in FIG. 7 is similar to the one in FIG. 4. Thus, like elements in FIGS. 4 and 7 bear like reference numerals. Certain aspects of FIG. 4 may be omitted from FIG. 7 in order to avoid obscuring other aspects of FIG. 7.

For a device that exhibits or hosts multiple software/hardware compute contexts (e.g., compute device 730), its resource requests may be tagged, by the tagging circuitry 412, with context identifiers (e.g., PASIDs) instead of device identifiers (e.g., B:D:F address tags). Some examples of these contexts include texture streamers or shaders in a graphics processing unit (GPU), compute contexts in an FPGA, or CPU cores implemented within an FPGA. According to an embodiment, in such cases, the mapping table 4 is extended to store entries that associate RMID and CLOS tags with PASIDs. This allows each unique compute context on the compute device to be distinguished and their respective resource requests tracked. Resource controls and monitoring can thus be extended to compute contexts without the need to make changes to the device or software contexts on the device. According to an embodiment, the hardware resource 732 on the compute device 730 is shared or context-swapped among the compute contexts 734-0~734-N using standard schedule logic and context management logic 736. The capability to track resource requests based on a requestor's PASID is highly desirable in present and future platforms with multi-context compute device(s). In such platforms, tagging only at the physical device level or virtual device level is not enough to provide the necessary level detail required in many applications, as different compute contexts may have different priorities and need to be tracked or monitored separately. Thus, the PASID-based approach is critical to enabling future FPGA-as-a-service or GPU-as-a-service compute models in datacenters with non-dedicated (i.e., shared) resources.

Figure 8:
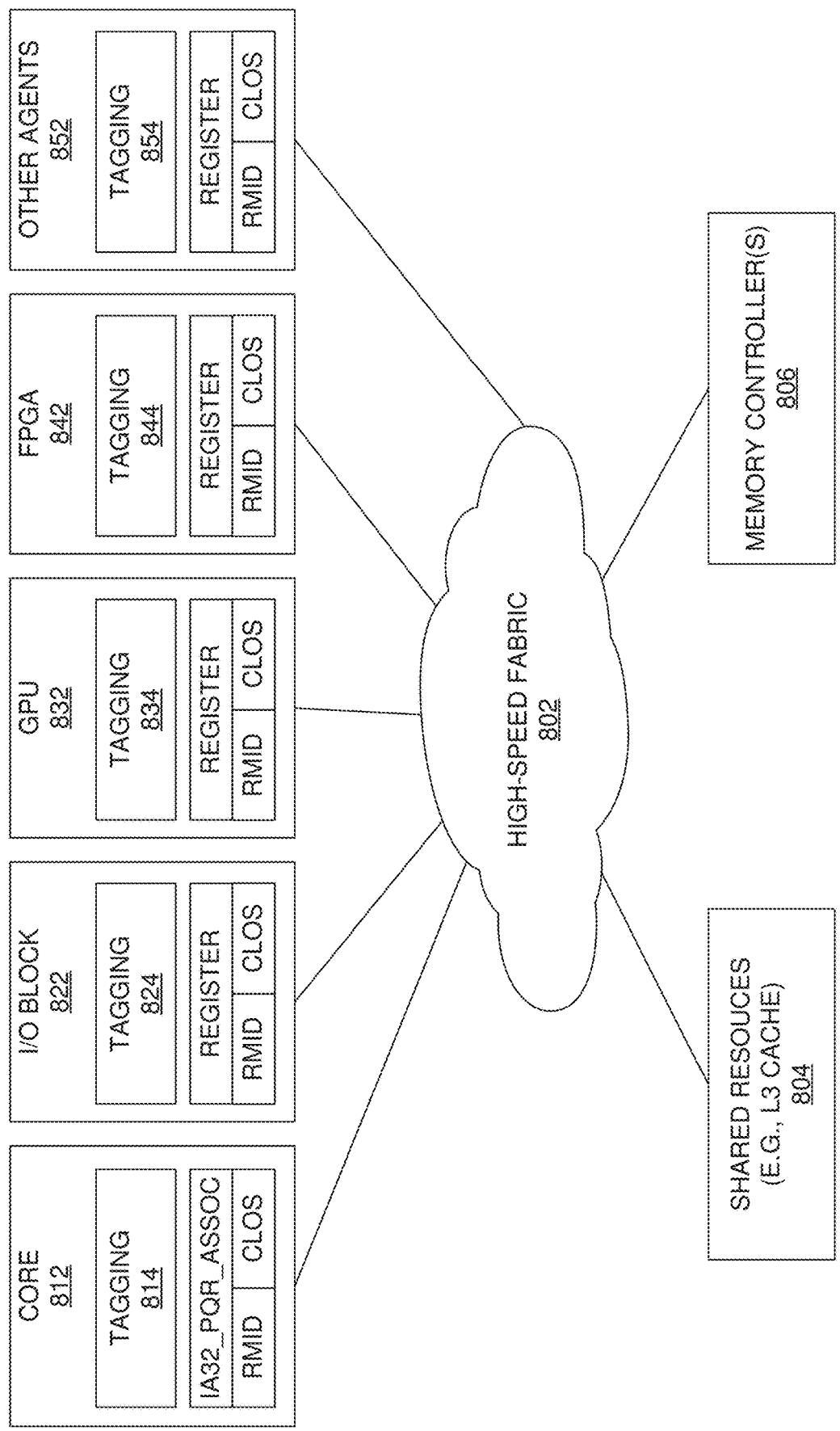
FIG. 8 illustrates a platform for extending the monitoring and control over shared resources to a variety of non-core type agents in accordance to an embodiment.

Much of the discuss thus far has focused on PCIe device, however, aspects of the invention is intended to be more broadly applied to any non-core agents. FIG. 8 illustrates an embodiment of a platform that extends monitoring and control over shared resources to a variety of non-core type agents on the platform. Through either leveraging the controller (e.g., IOMMU) built into these agents for address translation or implementing/allocating new register(s) to map one or more RMID/CLOS tags for the entire agent, the same monitoring and control mechanisms at the shared resources can be used. As illustrated in FIG. 8, each of the non-core agents 822, 832, 842, and 852 includes a respective register used to map all traffic from a non-core agent to a single RMID/CLOS. If, however, an IOMMU is implemented for a given non-core agent, then the components or compute contexts within that non-core agent can be mapped to specific RMIDs and/or CLOS. For example, the cache usage of the GPU 832 in its entirety may be mapped to RMID[5]/CLOS[3] while each execution unit (EU) or other compute units within the GPU may be mapped to a separate RMID/CLOS for more granular control and monitoring.

Figure 9:
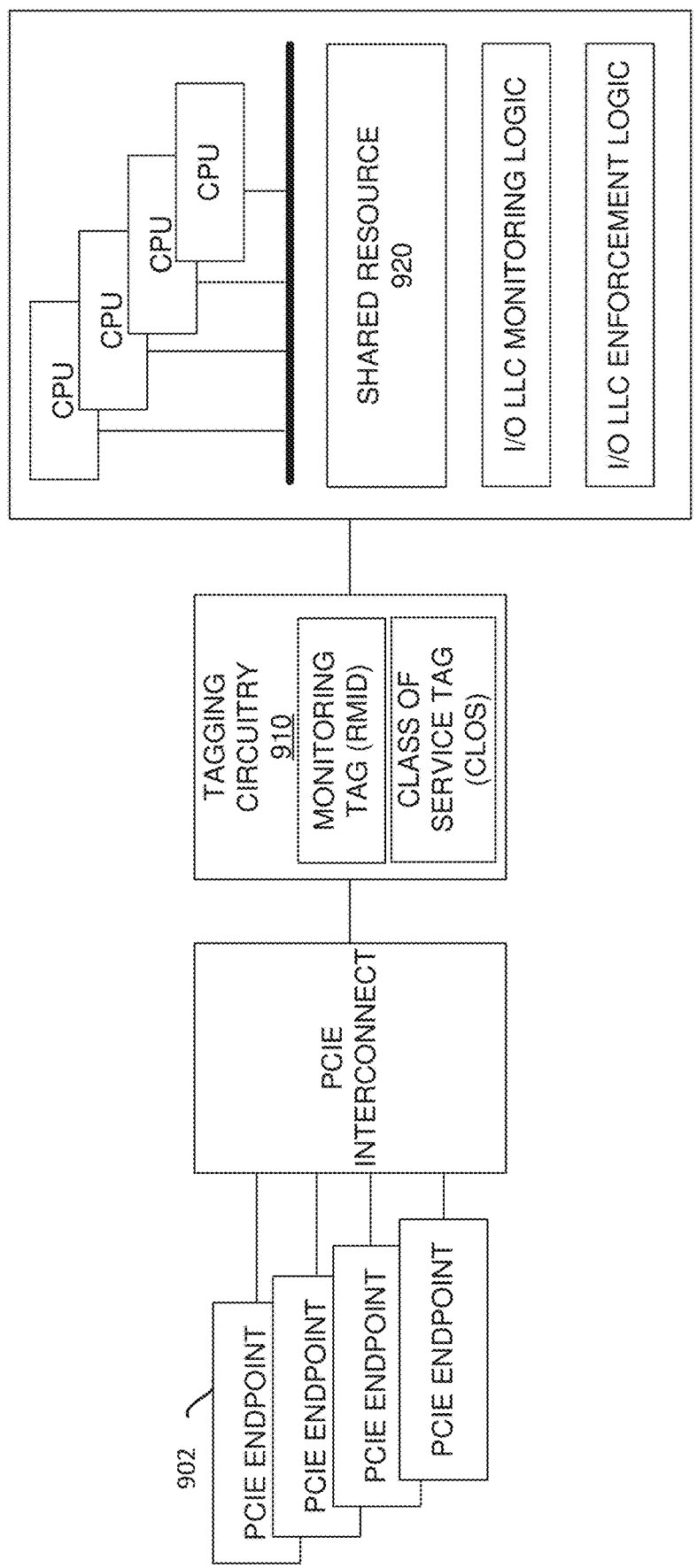
FIG. 9-11 illustrates different embodiments of where and how the tagging mechanism may be implement across different types of non-core agents.
Figure 10:
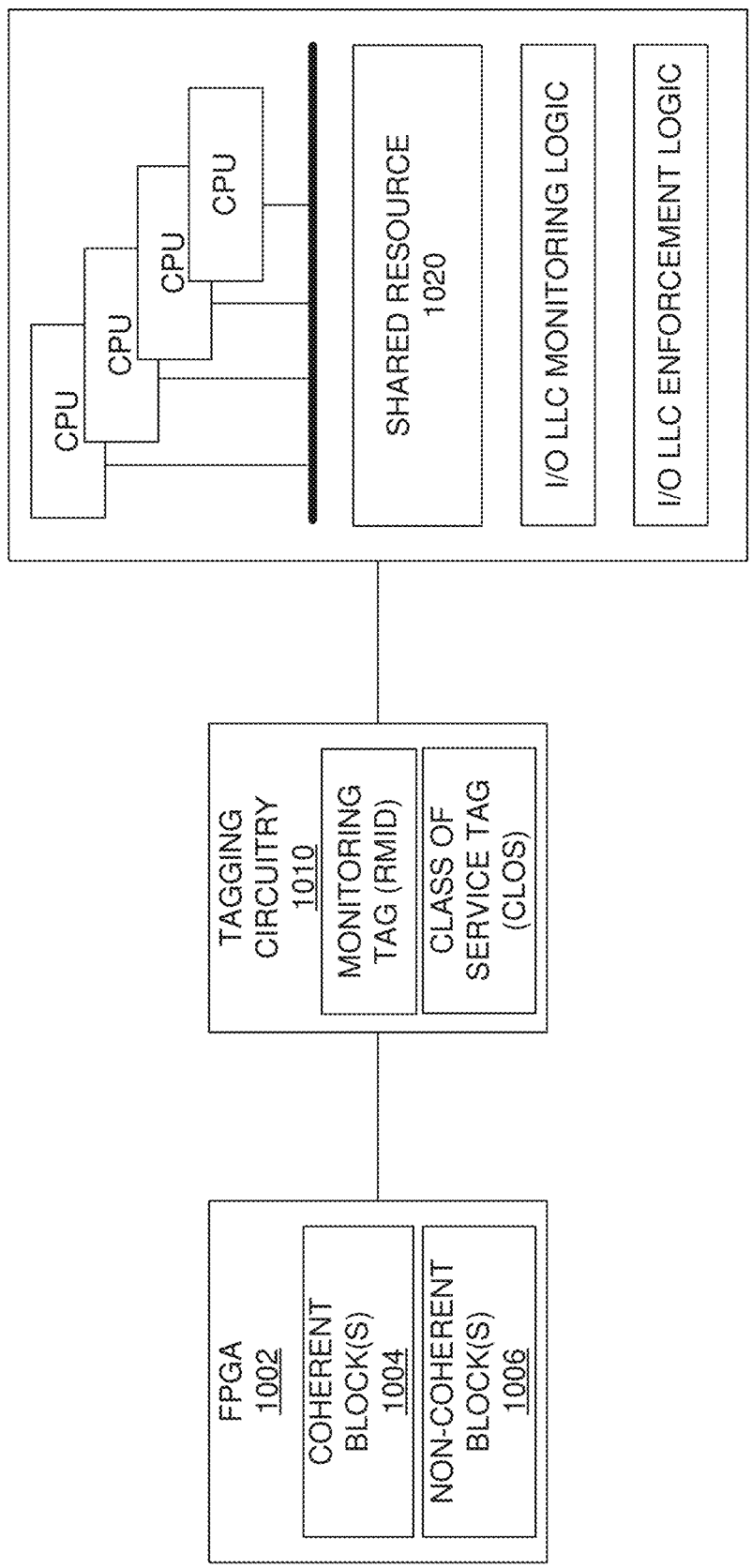
Figure 11:
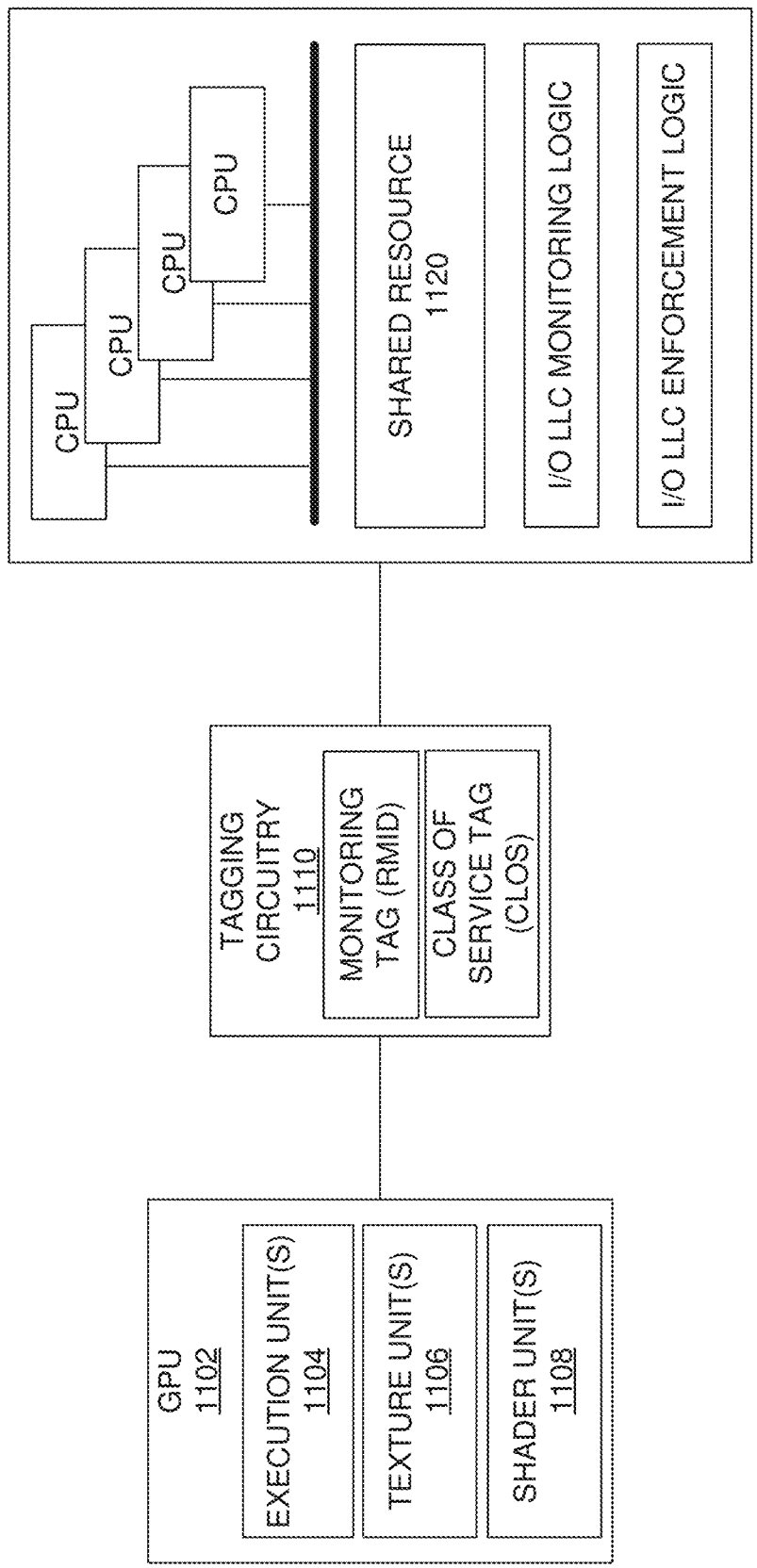

FIGS. 9-11 illustrates different embodiments of where and how the tagging mechanism may be implement across different types of non-core agents. FIG. 9 provides an example of how requests that originate from PCI endpoints 902 can be mapped to RMID/CLOS tags via the tagging circuitry 910, before these requests reach the monitoring 922 and enforcement logics 924 at the shared resource 920 (e.g., LLC or L3 cache), which interpret and use the RMID/CLOS values.

FIG. 10 provides an example of how resource requests that originate from FPGA 1002 may be mapped to RMID/CLOS tags via the tagging circuitry 1010. When resource requests are cache requests to the LLC/L3 cache, according to an embodiment, the resource requests that originate from the cache-coherent blocks 1004 are subject to the same monitoring and control mechanism as other non-core agents described above. For instance, the FPGA 1002 may be mapped as a whole via the RMID and CLOS tags stored in a register. Alternatively, if an IOMMU is present (not shown), different coherent blocks in the FPGA may be mapped as individual agents via hints supplied to the IOMMU. According to an embodiment, these supplied hints describe the type of requests generated by each coherent block. On the other hand, non-coherent cache blocks 1006 presents a special case. For blocks that use a subset of the LLC/L3 cache as non-coherent scratchpad, the associated cache requests may be managed by the I/O LLC enforcement management logic. Alternatively, or in addition, the bandwidth on the shared interconnect available to the requests from non-coherent blocks may be restricted based on bandwidth limits associated with the CLOS tags. If an IOMMU is present (not shown), then IOMMU-based tagging would be used.

FIG. 11 provides an example of how GPU resource utilization may be managed using the same approach described above. If an IOMMU is present, it could be used to map different RMID and CLOS tags to specific compute contexts and/or hardware blocks within the GPU, such as execution units 1104, texture units 1106, shader units 1108, etc. Alternatively, instead of an IOMMU, a register-based approach may be used to map the entire GPU to a single pair of RMID/CLOS tags for lower design and implementation costs, albeit at a much lower granularity of resource monitoring and control.

Figure 12:
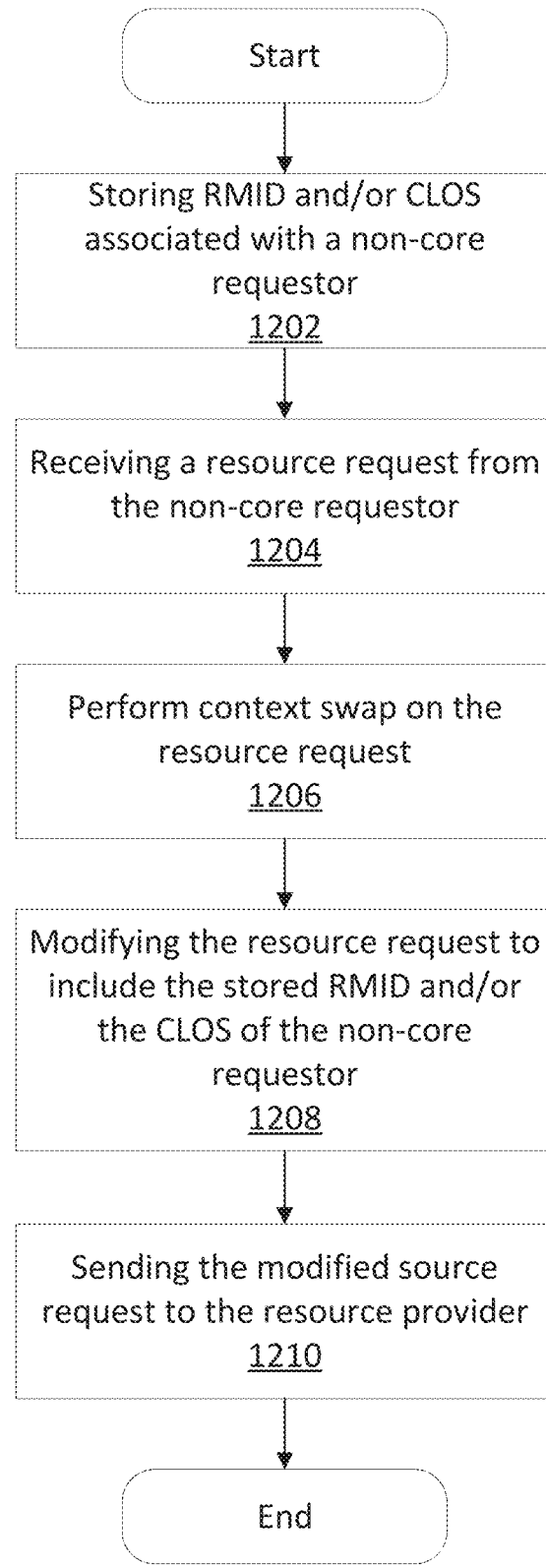
FIG. 12 is a flow diagram illustrating an embodiment of a method that may be performed by an input-output memory management unit (IOMMU).

FIG. 12 is a flow diagram illustrating an embodiment of a method. The method may be performed by an IOMMU. At block 1202, a pair of RMID and CLOS associated with a non-core requestor is stored. The RMID and the CLOS may be stored in a mapping table. In one embodiment, the mapping table comprises a plurality of table entries, each table entry stores an RMID and a CLOS for one of a plurality of non-core requestors. At block 1204, a resource request the non-core requestor to a resource provider is received. The received resource request includes an identifier that uniquely identifies the non-core requestor. At block 1206, a context swap may be performed on the resource request. The context swap may include translating a virtual address in the resource request into a physical address. At block 1208, the resource request is modified to include the stored RMID and the CLOS of the non-core requestor. At block 1210, the modified resource request, now including the RMID and the CLOS of the non-core requestor, is sent to the resource provider to be processed.

One embodiment of the present invention is a system that includes a plurality of core and non-core requestors, a mapping table, and a tagging circuitry. The plurality of core and non-core requestors may request shared resources provided by one or more resource providers. Each of the plurality of core and non-core requestors may be associated with a resource-monitoring tag and/or a resource-control tag. The mapping table may store the resource-monitoring and/or resource-control tags associated with each non-core requestor. The tagging circuitry may receive a resource request sent from a non-core requestor to a resource provider, and responsively modify the resource request to include the resource-monitoring and/or resource-control tags associated with the non-core requestor, based on information stored in the mapping table. The tagging circuitry may send the modified resource request to the resource provider. The resource provider may track the quantity of shared resources used by one or more core and non-core requestors based on the resource-monitoring tag associated with the one or more core and non-core requestors. The resource provider may adjust the quantity of shared resources that are available to one or more core and non-core requestors based on the resource-control tag associated with the one or more core and non-core requestors. The non-core requestors may include network cards, input-output (I/O) devices, graphics cards/accelerators, field-programmable gate arrays (FPGAs), and storage devices. The mapping table may track the resource-monitoring and/or the resource-control tags of an associated non-core requestor by using a PCIe Bus/Device/Function (B:D:F) identification that uniquely identifies the associated non-core requestor. Alternatively, or additionally, the mapping table may track the resource-monitoring and/or the resource-control tags of the associated non-core requestor by using a physical address space identification (PASID) that uniquely identifies the associated non-core requestor. The associated non-core requestor may be a compute context that is executing or generating the resource request. The resource-monitoring tags associated with the plurality of core and non-core requestors may be selected from a single pool of resource-monitoring tags shared by the plurality of core and non-core requestors. Alternatively, the resource-monitoring tags associated with the plurality of core requestors may be selected from a first pool of resource-monitoring tags, while the resource-control tags associated with the plurality of non-core requestors are selected from a second pool of resource-control tags. Similarly, the resource-control tags associated with the plurality of core and non-core requestors may be selected from a single pool of resource-control tags, or alternatively, the resource-control tags associated with the plurality of core requestors may be selected from a first pool of resource-control tags while the resource-control tags associated with each plurality of non-core requestors are selected from a second pool of resource-control tags. An operating system (OS) or a virtual machine manager (VMM) running on the OS may control the shared resources used by one or more non-core resource requestor by modifying the resource-control tag associated with the one or more non-core requestors in the mapping table. The shared resources may include cache lines and/or cache line access bandwidths in a last level cache (LLC) or level 3 (L3) cache. The mapping table and the tagging circuitry may be implemented as part of an input-output memory management unit (IOMMU). Alternatively, the mapping table may be implemented as a register comprising one pair of resource-monitoring and resource-control tags that are to be associated with all non-core requestors of the same hardware device. The resource-monitoring tag may include a resource monitoring identification (RMID) and the resource-control tag may include a class of service identification (CLOS).

Another embodiment of the present invention is a method that includes storing a resource-monitoring tag and/or a resource-control tag for each of a plurality of non-core requestors of shared resources that are provided by one or more resource providers, receiving a resource request sent from a non-core requestor to a resource provider, responsively modifying the resource request to include the resource-monitoring and/or resource-control tags associated with the non-core requestor, and sending the modified resource request to the resource provider. The non-core requestors may include network cards, input-output (I/O) devices, graphics cards/accelerators, field-programmable gate arrays (FPGAs), and storage devices. The method may further include associating the resource-monitoring and/or resource-control tags of the non-core requestor with a PCIe Bus/Device/Function (B:D:F) address tag that uniquely identifies the non-core requestor. Alternatively, or additionally, the method may include associating the resource-monitoring and resource-control tags of the non-core requestor with a physical address space identification (PASID) that uniquely identifies the non-core requestor. The non-core requestor may be a compute context in a hardware device. The resource-monitoring tags associated with the non-core requestors may be selected from a single pool of resource-monitoring tags that is shared by the plurality of non-core requestors and one or more core requestors. Alternatively, the resource-monitoring tags associated with the non-core requestors may be selected from a pool of resource-monitoring tags that is not shared with any core requestors. Similarly, the resource-control tags associated with the non-core requestors may be selected from a single pool of resource-control tags that is shared by the plurality of non-core requestors and one or more core requestors, or alternatively, the resource-control tags associated with the non-core requestors may be selected from a pool of resource-control tags that is not shared with any core requestors. The method may further include modifying the stored resource-control tag associated with the non-core requestor to control a quantity of the shared resources that is available to non-core requestor. The shared resources may include cache lines and/or cache line access bandwidths in a last level cache (LLC) or level 3 (L3) cache. The method may include storing the plurality of resource-monitoring tags and resource-control tags in a mapping table of an input-output memory management unit (IOMMU). Alternatively, the method may include storing in a register a single pair of resource-monitoring and resource-control tags that are to be associated with all non-core requestors in the same hardware device. The resource-monitoring tag may include a resource monitoring identification (RMID) and the resource-control tag may include a class of service identification (CLOS).

Yet another embodiment of the present invention is a non-transitory machine-readable medium having program code stored thereon which, when executed by a machine, causes the machine to perform operations that include storing a resource-monitoring tag and/or a resource-control tag for each of a plurality of non-core requestors of shared resources that are provided by one or more resource providers; receiving a resource request sent from a non-core requestor to a resource provider; responsively modifying the resource request to include the resource-monitoring and/or resource-control tags associated with the non-core requestor; and sending the modified resource request to the resource provider. The non-core requestors may include network cards, input-output (I/O) devices, graphics cards/ accelerators, field-programmable gate arrays (FPGAs), and storage devices. The operations may further include associating the resource-monitoring and resource-control tags of the non-core requestor with a PCIe Bus/Device/Function (B:D:F) address tag that uniquely identifies the non-core requestor. Alternatively, or additionally, the operations may include associating the resource-monitoring and resource-control tags of the non-core requestor with a physical address space identification (PASID) that uniquely identifies the non-core requestor, which may be a compute context in a hardware device. The resource-monitoring tags associated with the non-core requestors may be selected from a single pool of resource-monitoring tags that is shared by the plurality of non-core requestors and one or more core requestors. Alternatively, these resource-monitoring tags may be selected from a pool of resource-monitoring tags that is not shared with any core requestors. Similarly, the resource-control tags associated with the non-core requestors may be selected from a single pool of resource-control tags that is shared by the plurality of non-core requestors and one or more core requestors, or alternatively, these resource-control tags may be selected from a pool of resource-control tags that is not shared with any core requestors. The operations may further include modifying the stored resource-control tag associated with the non-core requestor to control a quantity of the shared resources that is available to non-core requestor. The shared resources may include cache lines and/or cache line bandwidth in a last level cache (LLC) or level 3 (L3) cache. The operations may further include storing the plurality of resource-monitoring tags and resource-control tags in a mapping table of an input-output memory management unit (IOMMU). Alternatively, a single pair of resource-monitoring and resource-control tags may be stored in a register and associated with all non-core requestors in a hardware device. The resource-monitoring tag may include a resource monitoring identification (RMID) and the resource-control tag comprises a class of service identification (CLOS). Moreover, the operations may further include tracking a quantity of a shared resource used by one or more core and non-core requestors based on a resource-monitoring tag associated with the one or more core and non-core requestors; and limiting the quantity of the shared resource available to the one or more core and non-core requestors based on a resource-control tag associated with the one or more core and non-core requestors.

Embodiments of the present invention also include an apparatus that includes storage means for storing a resource-monitoring tag and a resource-control tag for each of a plurality of non-core requestors of shared resources, the shared resources provided by one or more resource providers; and tagging means for receiving a resource request sent from a non-core requestor to a resource provider and responsively modifying the resource request to include the resource-monitoring and resource-control tags associated with the non-core requestor and sending the modified resource request to the resource provider. The non-core requestors may include network cards, input-output (I/O) devices, graphics cards/accelerators, field-programmable gate arrays (FPGAs), and storage devices. The apparatus may further include means for associating the resource-monitoring and resource-control tags of the non-core requestor with a PCIe Bus/Device/Function (B:D:F) address tag that uniquely identifies the non-core requestor. Alternatively, or additionally, the apparatus may include means for associating the resource-monitoring and resource-control tags of the non-core requestor with a physical address space identification (PASID) that uniquely identifies the non-core requestor, which may be a compute context in a hardware device. The resource-monitoring tags associated with the non-core requestors may be selected from a single pool of resource-monitoring tags that is shared by the plurality of non-core requestors and one or more core requestors. Alternatively, the resource-monitoring tags associated with the non-core requestors may be selected from a pool of resource-monitoring tags that is not shared with any core requestors. Similarly, the resource-control tags associated with the non-core requestors may be selected from a single pool of resource-control tags that is shared by the plurality of non-core requestors and one or more core requestors, or alternatively, the resource-control tags associated with the non-core requestors may be selected from a pool of resource-control tags that is not shared with any core requestors. The apparatus may further include means for modifying the stored resource-control tag associated with the non-core requestor to control a quantity of the shared resources that is available to non-core requestor. The shared resources may include cache lines and/or cache line access bandwidths in a last level cache (LLC) or level 3 (L3) cache. The resource-monitoring tag may include a resource monitoring identification (RMID) and the resource-control tag may include a class of service identification (CLOS). Furthermore, the apparatus may additionally include means for tracking a quantity of a shared resource used by one or more core and non-core requestors based on a resource-monitoring tag associated with the one or more core and non-core requestors; and means for limiting the quantity of the shared resource available to the one or more core and non-core requestors based on a resource-control tag associated with the one or more core and non-core requestors.

Another embodiment of the present invention is a system that includes one or more resource providers and a plurality of core and non-core requestors that are to request shared resources from the one or more resource providers. Each of the plurality of core and non-core requestors may be associated with a resource-monitoring tag and or a resource-control tag. The system may include a usage monitoring circuitry that tracks the quantity of different shared resource used by each requestor based on their respective resource-monitoring tags. The system may also include a usage control circuitry that limits the quantity of different shared resources that are available to each requestor based on their respective resource-control tags. The quantity of shared resources may be limited by the usage control circuitry by using different way masks.

Figure 13:
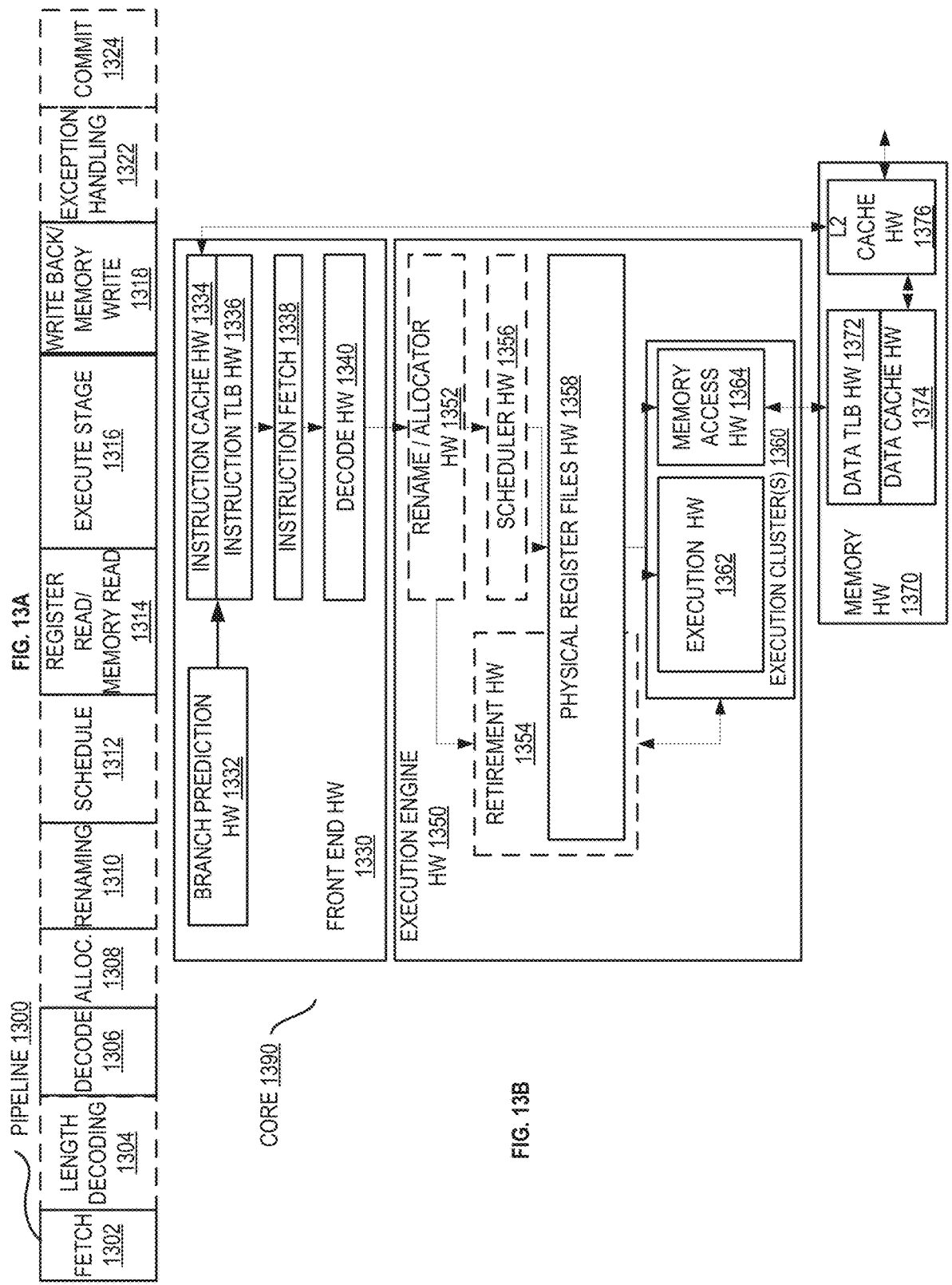
FIG. 13A is a block diagram illustrating both an exemplary in-order pipeline and an exemplary register renaming, out-of-order issue/execution pipeline according to embodiments of the invention.
FIG. 13B is a block diagram illustrating both an exemplary embodiment of an in-order architecture core and an exemplary register renaming, out-of-order issue/execution architecture core to be included in a processor according to embodiments of the invention.

FIG. 13A is a block diagram illustrating both an exemplary in-order pipeline and an exemplary register renaming, out-of-order issue/execution pipeline according to embodiments of the invention. FIG. 13B is a block diagram illustrating both an exemplary embodiment of an in-order architecture core and an exemplary register renaming, out-oforder issue/execution architecture core to be included in a processor according to embodiments of the invention. The solid lined boxes in FIGS. 13A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324.

FIG. 13B shows processor core 1390 including a front end hardware 1330 coupled to an execution engine hardware 1350, and both are coupled to a memory hardware 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end hardware 1330 includes a branch prediction hardware 1332 coupled to an instruction cache hardware 1334, which is coupled to an instruction translation lookaside buffer (TLB) 1336, which is coupled to an instruction fetch hardware 1338, which is coupled to a decode hardware 1340. The decode hardware 1340 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 1340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1390 includes a microcode ROM or other medium that stores microcode for certain macroinstructions (e.g., in decode hardware 1340 or otherwise within the front end hardware 1330). The decode hardware 1340 is coupled to a rename/allocator hardware 1352 in the execution engine hardware 1350.

The execution engine hardware 1350 includes the rename/allocator hardware 1352 coupled to a retirement hardware 1354 and a set of one or more scheduler hardware 1356. The scheduler hardware 1356 represents any number of different schedulers, including reservations stations, central instruction window, etc. The scheduler hardware 1356 is coupled to the physical register file(s) hardware 1358. Each of the physical register file(s) hardware 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 1358 comprises a vector registers hardware, a write mask registers hardware, and a scalar registers hardware. This register hardware may provide architectural vector registers, vector mask registers, and general purpose registers. The physical register file(s) hardware 1358 is overlapped by the retirement hardware 1354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 1354 and the physical register file(s) hardware 1358 are coupled to the execution cluster(s) 1360. The execution cluster(s) 1360 includes a set of one or more execution hardware 1362 and a set of one or more memory access hardware 1364. The execution hardware 1362 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 1356, physical register file(s) hardware 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 1364). It should also be understood that where separate pipelines are used, one or more of these pipelines may be out-of-order issue/execution and the rest in-order.

The set of memory access hardware 1364 is coupled to the memory hardware 1370, which includes a data TLB hardware 1372 coupled to a data cache hardware 1374 coupled to a level 2 (L2) cache hardware 1376. In one exemplary embodiment, the memory access hardware 1364 may include a load hardware, a store address hardware, and a store data hardware, each of which is coupled to the data TLB hardware 1372 in the memory hardware 1370. The instruction cache hardware 1334 is further coupled to a level 2 (L2) cache hardware 1376 in the memory hardware 1370. The L2 cache hardware 1376 is coupled to one or more other levels of cache and eventually to a main memory.

By way of example, the exemplary register renaming, out-of-order issue/execution core architecture may implement the pipeline 1300 as follows: 1) the instruction fetch 1338 performs the fetch and length decoding stages 1302 and 1304; 2) the decode hardware 1340 performs the decode stage 1306; 3) the rename/allocator hardware 1352 performs the allocation stage 1308 and renaming stage 1310; 4) the scheduler hardware 1356 performs the schedule stage 1312; 5) the physical register file(s) hardware 1358 and the memory hardware 1370 perform the register read/memory read stage 1314; the execution cluster 1360 perform the execute stage 1316; 6) the memory hardware 1370 and the physical register file(s) hardware 1358 perform the write back/memory write stage 1318; 7) various hardware may be involved in the exception handling stage 1322; and 8) the retirement hardware 1354 and the physical register file(s) hardware 1358 perform the commit stage 1324.

The core 1390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 1334/1374 and a shared L2 cache hardware 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 14:
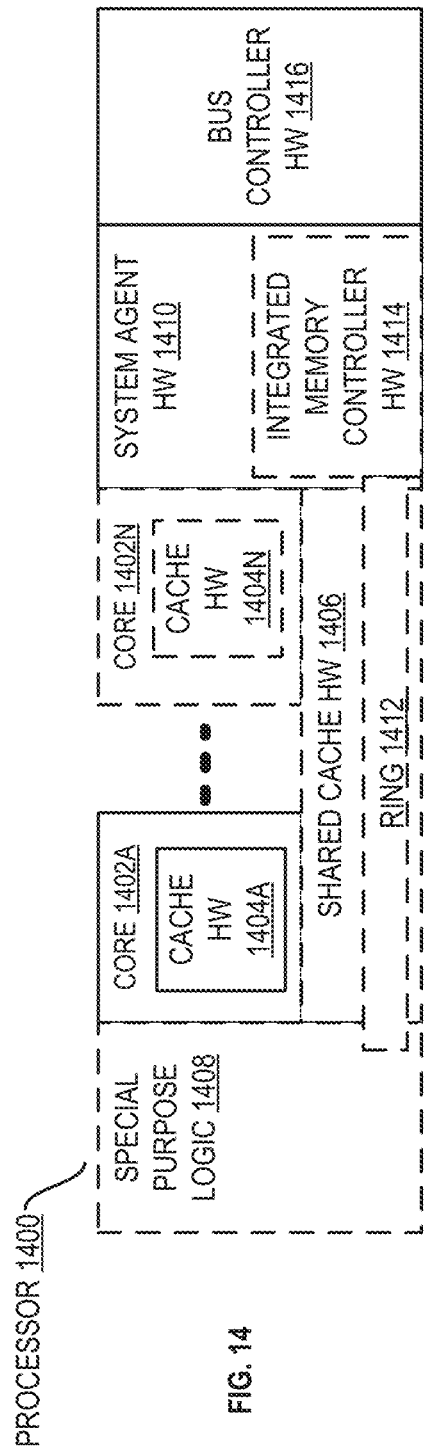
FIG. 14 is a block diagram of a single core processor and a multicore processor with integrated memory controller and graphics according to embodiments of the invention.

FIG. 14 is a block diagram of a processor 1400 that may have more than one core, may have an integrated memory controller, and may have integrated graphics according to embodiments of the invention. The solid lined boxes in FIG. 14 illustrate a processor 1400 with a single core 1402A, a system agent 1410, a set of one or more bus controller hardware 1416, while the optional addition of the dashed lined boxes illustrates an alternative processor 1400 with multiple cores 1402A-N, a set of one or more integrated memory controller hardware 1414 in the system agent hardware 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1406, and external memory (not shown) coupled to the set of integrated memory controller hardware 1414. The set of shared cache hardware 1406 may include one or more mid-level caches, such as level 2 (L2), level 3 (L3), level 4 (L4), or other levels of cache, a last level cache (LLC), and/or combinations thereof. While in one embodiment a ring based interconnect hardware 1412 interconnects the integrated graphics logic 1408, the set of shared cache hardware 1406, and the system agent hardware 1410/integrated memory controller hardware 1414, alternative embodiments may use any number of well-known techniques for interconnecting such hardware. In one embodiment, coherency is maintained between one or more cache hardware 1406 and cores 1402-A-N.

In some embodiments, one or more of the cores 1402A-N are capable of multithreading. The system agent 1410 includes those components coordinating and operating cores 1402A-N. The system agent hardware 1410 may include for example a power control unit (PCU) and a display hardware. The PCU may be or include logic and components needed for regulating the power state of the cores 1402A-N and the integrated graphics logic 1408. The display hardware is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set. In one embodiment, the cores 1402A-N are heterogeneous and include both the "small" cores and "big" cores described below.

FIGS. 15-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
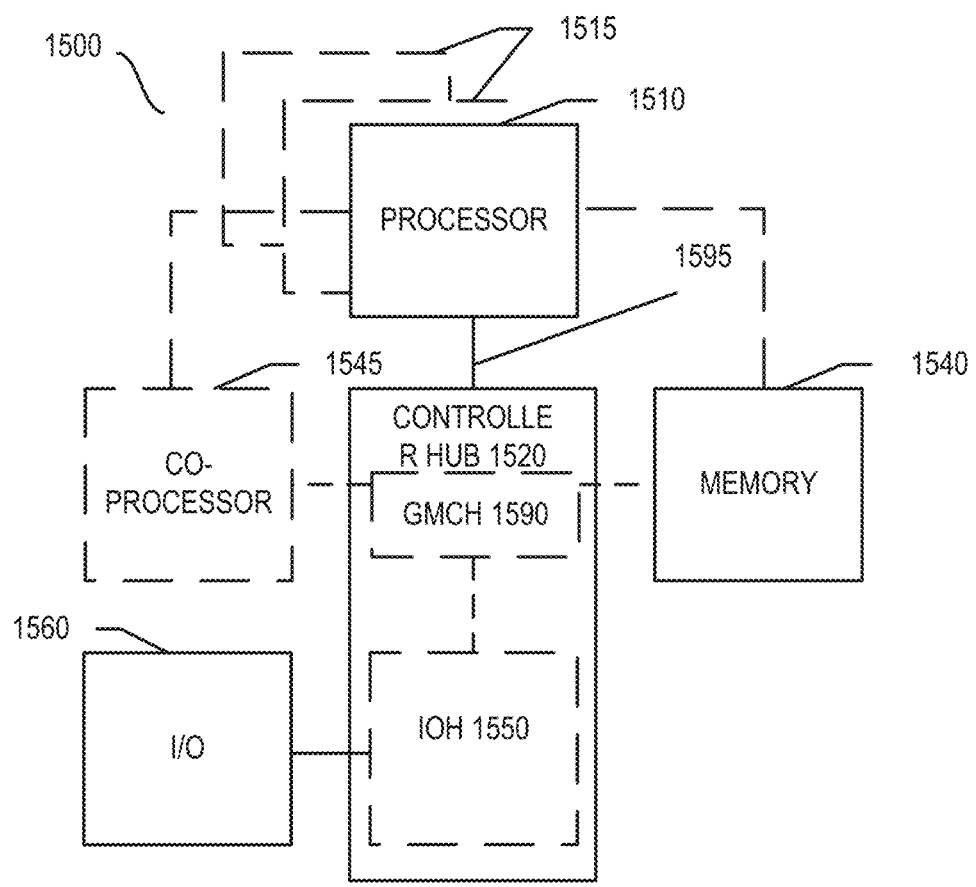
FIG. 15 illustrates a block diagram of a system in accordance with one embodiment of the present invention.

Referring now to FIG. 15, shown is a block diagram of a system 1500 in accordance with one embodiment of the present invention. The system 1500 may include one or more processors 1510, 1515, which are coupled to a controller hub 1520. In one embodiment the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 is couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one embodiment, the controller hub 1520 communicates with the processor(s)

1510, 1515 via a multi-drop bus, such as a frontside bus (FSB), point-to-point interface, or similar connection 1595.

In one embodiment, the coprocessor 1545 is a special-purpose processor, such as, for example, a high-throughput MIC processor, a network or communication processor, compression engine, graphics processor, GPGPU, embedded processor, or the like. In one embodiment, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In one embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor(s) 1545 accept and execute the received coprocessor instructions.

Figure 16:
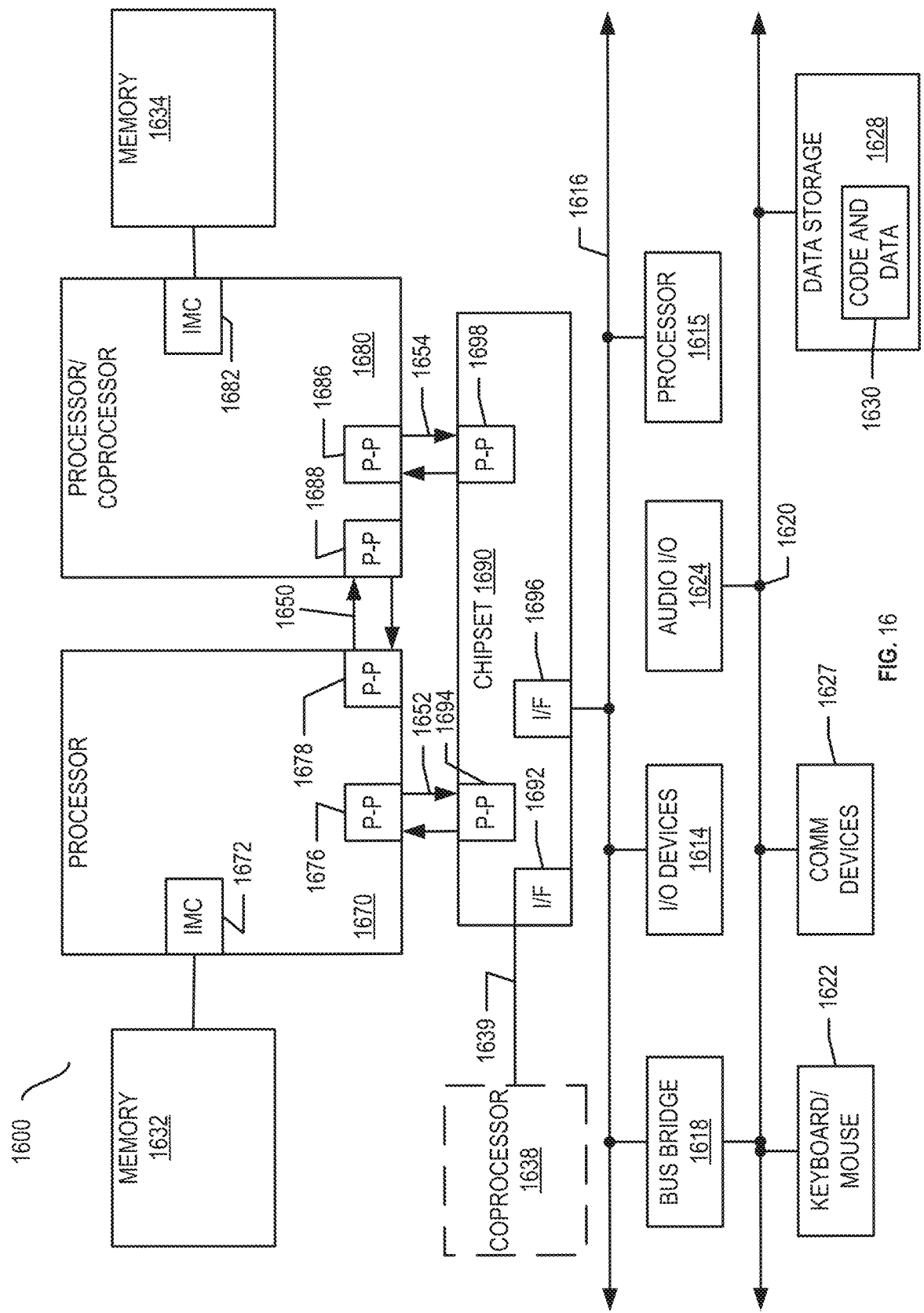
FIG. 16 illustrates a block diagram of a second system in accordance with an embodiment of the present invention.

Referring now to FIG. 16, shown is a block diagram of a first more specific exemplary system 1600 in accordance with an embodiment of the present invention. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In one embodiment of the invention, processors 1670 and 1680 are respectively processors 1510 and 1515, while coprocessor 1638 is coprocessor 1545. In another embodiment, processors 1670 and 1680 are respectively processor 1510 coprocessor 1545.

Processors 1670 and 1680 are shown including integrated memory controller (IMC) hardware 1672 and 1682, respectively. Processor 1670 also includes as part of its bus controller hardware point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1639. In one embodiment, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present invention is not so limited.

As shown in FIG. 16, various I/O devices 1614 may be coupled to first bus 1616, along with a bus bridge 1618 which couples first bus 1616 to a second bus 1620. In one embodiment, one or more additional processor(s) 1615, such as coprocessors, high-throughput MIC processors, GPGPU's, accelerators (such as, e.g., graphics accelerators or digital signal processing (DSP) hardware), field programmable gate arrays, or any other processor, are coupled to first bus 1616. In one embodiment, second bus 1620 may be a low pin count (LPC) bus. Various devices may be coupled to a second bus 1620 including, for example, a keyboard and/or mouse 1622, communication devices 1627 and a storage hardware 1628 such as a disk drive or other mass storage device which may include instructions/code and data 1630, in one embodiment. Further, an audio I/O 1624 may be coupled to the second bus 1620. Note that other architectures are possible. For example, instead of the point-to-point architecture of FIG. 16, a system may implement a multi-drop bus or other such architecture.

Figure 17:
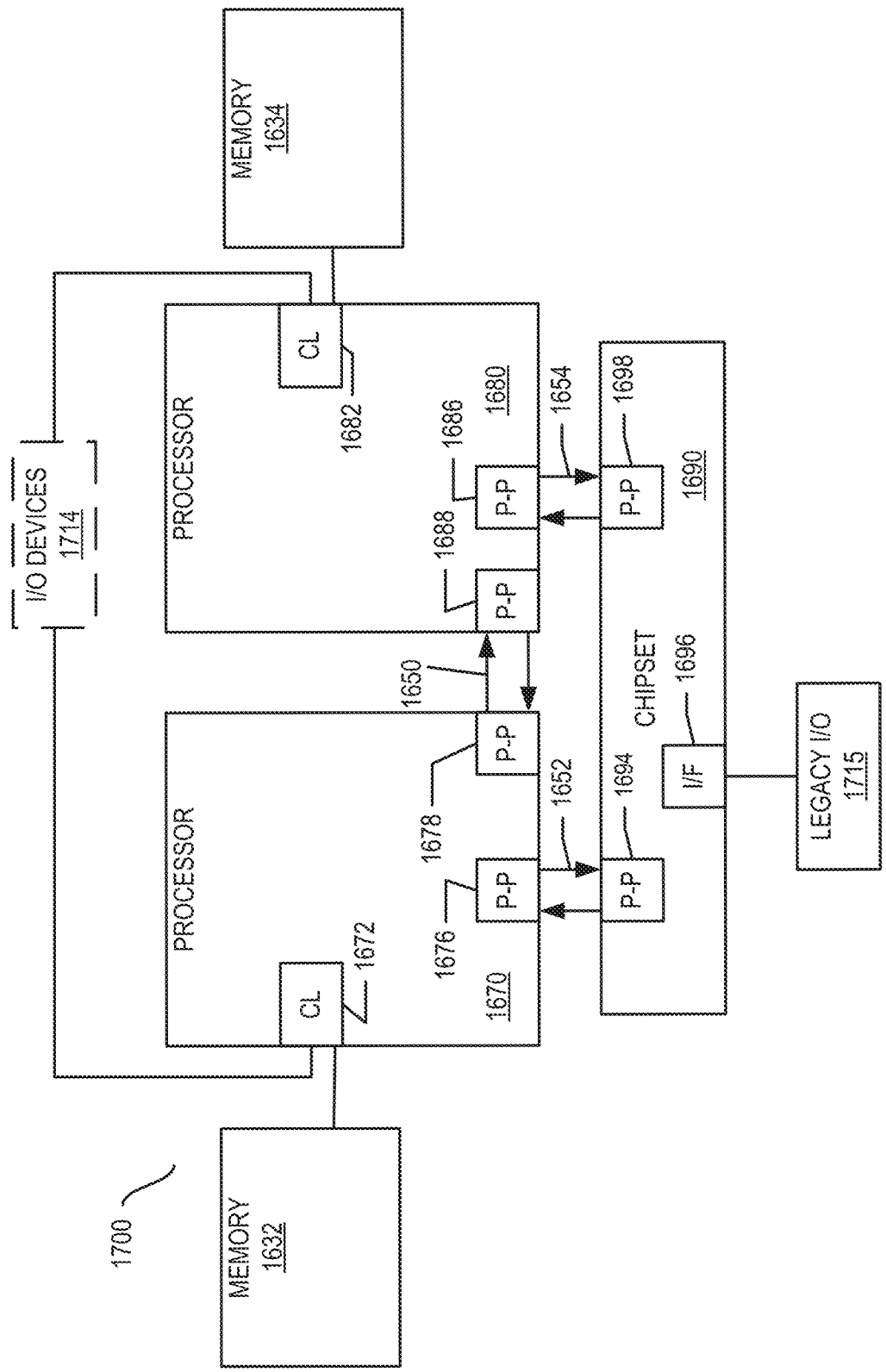
FIG. 17 illustrates a block diagram of a third system in accordance with an embodiment of the present invention.

Referring now to FIG. 17, shown is a block diagram of a second more specific exemplary system 1700 in accordance with an embodiment of the present invention. Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1672 and 1682, respectively. Thus, the CL 1672, 1682 include integrated memory controller hardware and include I/O control logic. FIG. 17 illustrates that not only are the memories 1632, 1634 coupled to the CL 1672, 1682, but also that I/O devices 1714 are also coupled to the control logic 1672, 1682. Legacy I/O devices 1715 are coupled to the chipset 1690.

Figure 18:
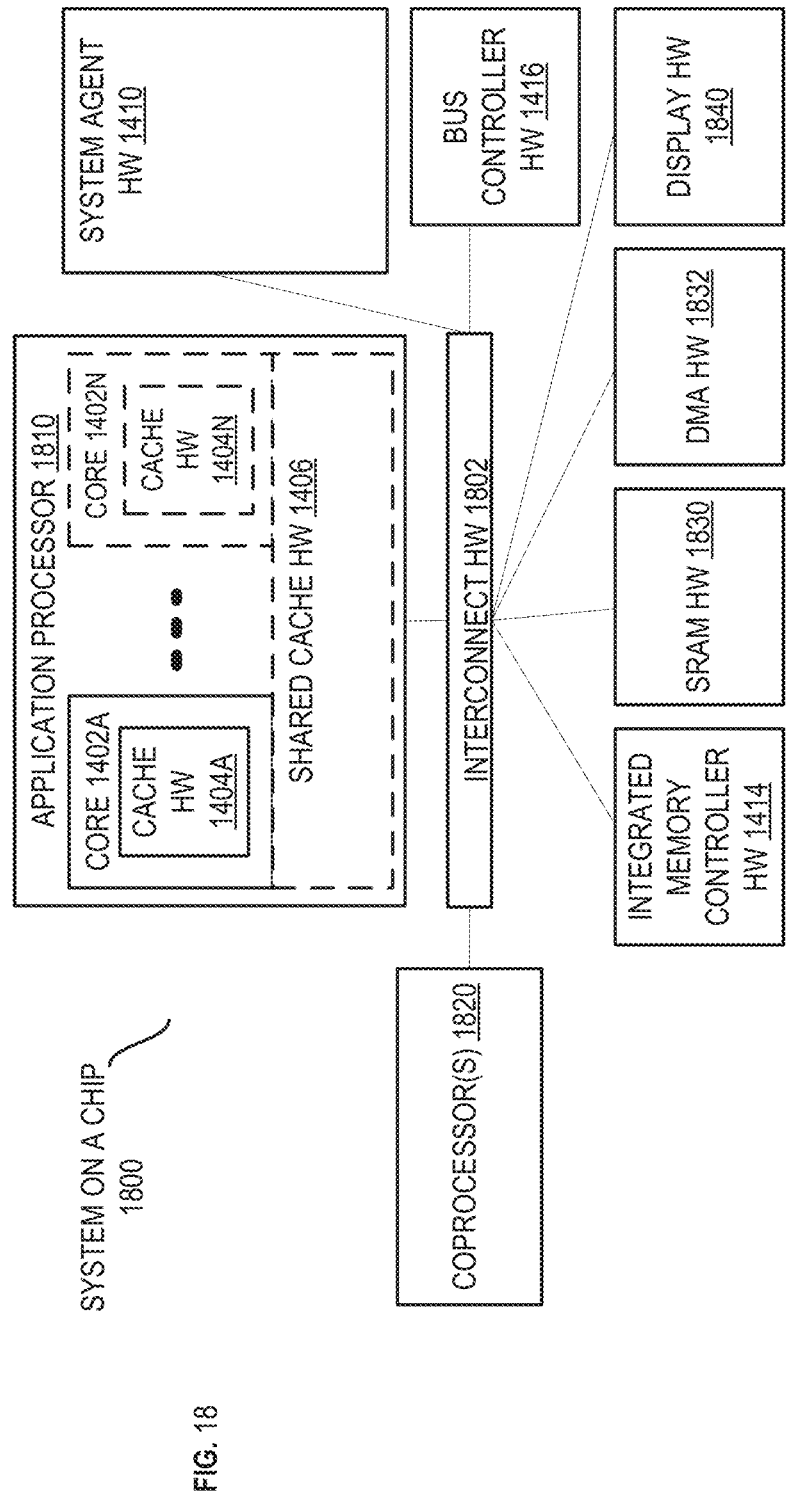
FIG. 18 illustrates a block diagram of a system on a chip (SoC) in accordance with an embodiment of the present invention.

Referring now to FIG. 18, shown is a block diagram of a SoC 1800 in accordance with an embodiment of the present invention. Similar elements in FIG. 14 bear like reference numerals. Also, dashed lined boxes are optional features on more advanced SoCs. In FIG. 18, an interconnect hardware 1802 is coupled to: an application processor 1810 which includes a set of one or more cores 1402A-N and shared cache hardware 1406; a system agent hardware 1410; a bus controller hardware 1416; an integrated memory controller hardware 1414; a set or one or more coprocessors 1820 which may include integrated graphics logic, an image processor, an audio processor, and a video processor; an static random access memory (SRAM) hardware 1830; a direct memory access (DMA) hardware 1832; and a display hardware 1840 for coupling to one or more external displays. In one embodiment, the coprocessor(s) 1820 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 19 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A system comprising:
    a plurality of core and non-core requestors within a chip multiprocessor, the plurality of core and non-core requestors sharing shared resources provided by one or more resource providers, each of the plurality of core and non-core requestors associated with a respective resource-monitoring tag and a resource-control tag;
    a mapping table to store the resource-monitoring and resource-control tags associated with each of the non-core requestors;
    tagging circuitry to:
        receive a resource request sent from a first non-core requestor to a first resource provider, the resource request comprising a first address in an address space of the first non-core requestor;
        translate the first address to a second address in an address space of the first resource provider;
        look up the resource-monitoring and resource-control tags of the first non-core requestor from the mapping table;
        modify the resource request to replace the first address with the second address and to include the resource-monitoring and resource-control tags of the first non-core requestor to generate a modified resource request; and
        send the modified resource request to the first resource provider; and
    interconnect interface to perform address range check on the second address and tag validation on the resource-monitoring and resource-control tags in the modified resource request to ensure the modified request is proper for the first resource provider;
    wherein the first resource provider is to use the resource monitoring tag and the resource control tag to count a number of cache lines in use by the first non-core requestor.

2. The system of claim 1, wherein the first resource provider is to track a quantity of the shared resources used by one or more core and non-core requestors based on the resource-monitoring tag associated with the one or more core and non-core requestors.

3. The system of claim 1, wherein the first resource provider to adjust a quantity of the shared resources available to one or more core and non-core requestors based on the resource-control tag associated with the one or more core and non-core requestors.

4. The system of claim 1, wherein the non-core requestors comprises network cards, input-output (I/O) devices, graphics cards/accelerators, field-programmable gate arrays (FPGAs), and storage devices.

5. The system of claim 1, wherein the mapping table is to track the resource-monitoring and resource-control tags of an associated non-core requestor by using a PCIe Bus/Device/Function (B:D:F) identification that uniquely identifies the associated non-core requestor.

6. The system of claim 1, wherein the mapping table is to track the resource-monitoring and resource-control tags of an associated non-core requestor by using a physical address space identification (PASID) that uniquely identifies the associated non-core requestor, wherein the associated non-core requestor is a compute context that is executing or generating the resource request.

7. The system of claim 1, wherein the resource-monitoring tags associated with the plurality of core and non-core requestors are selected from a single pool of resource-monitoring tags shared by the plurality of core and non-core requestors.

8. The system of claim 1, wherein the resource-monitoring tags associated with the plurality of core requestors are selected from a first pool of resource-monitoring tags and the resource-control tags associated with the plurality of non-core requestors are selected from a second pool of resource-control tags.

9. The system of claim 1, wherein the resource-control tags associated with the plurality of core and non-core requestors are selected from a single pool of resource-control tags.

10. The system of claim 1, wherein the resource-control tags associated with the plurality of core requestors are selected from a first pool of resource-control tags and the resource-control tags associated with of each plurality of non-core requestors are selected from a second pool of resource-control tags.

11. The system of claim 1, wherein an operating system (OS) or a virtual machine manager (VMM) running on the OS is to control the shared resources used by one or more non-core resource requestor by modifying the resource-control tag associated with the one or more non-core requestors in the mapping table.

12. The system of claim 1, wherein the shared resources comprise cache lines in a last level cache (LLC) or level 3 (L3) cache.

13. The system of claim 1, wherein the shared resources comprise cache lines access bandwidth in a last level cache (LLC) or level 3 (L3) cache.

14. The system of claim 1, wherein the mapping table and the tagging circuitry are implemented as part of an input-output memory management unit (IOMMU).

15. The system of claim 1, wherein the mapping table is implemented as a register comprising one pair of resource-monitoring and resource-control tags to be associated with one or more non-core requestors in a same hardware device.

16. The system of claim 1, wherein the resource-monitoring tag comprises a resource monitoring identification (RMID) and the resource-control tag comprises a class of service identification (CLOS).

17. A method comprising:
providing, by one or more resource providers, shared resources to a plurality of core and non-core requestors within a chip multiprocessor, each of the plurality of core and non-core requestors associated with a respective resource-monitoring tag and a resource-control tag;
storing the resource-monitoring tag and the resource-control tag of each of the non-core requestors in a mapping table;
receiving a resource request sent from a first non-core requestor to a first resource provider the resource request comprising a first address in an address space of the first non-core requestor;
translating the first address to a second address in an address space of the first resource provider;
looking up the resource-monitoring and resource-control tags of the first non-core requestor from the mapping table;
modifying the resource request to replace the first address with the second address and to include the resource-monitoring and resource-control tags of the first non-core requestor to generate a modified resource request;
performing address range check and tag validation to ensure the modified request is proper for the first resource provider;
sending the modified resource request to the first resource provider; and
performing address range check on the second address and tag validation on the resource-monitoring and resource-control tags in the modified resource request to ensure the modified request is proper for the first resource provider; and
using the resource monitoring tag and the resource control tag to count a number of cache lines in use by the first non-core requestor.

18. The method of claim 17 further comprising associating the resource-monitoring and resource-control tags of the non-core requestor with a PCIe Bus/Device/Function (B:D:F) address tag that uniquely identifies the non-core requestor.

19. The method of claim 17 further comprising associating the resource-monitoring and resource-control tags of the non-core requestor with a physical address space identification (PASID) that uniquely identifies the non-core requestor, the non-core requestor being a compute context in a hardware device.

20. The method of claim 17 further comprising modifying the stored resource-control tag associated with the non-core requestor to control a quantity of the shared resources that is available to non-core requestor.

21. The method of claim 17 further comprising storing the plurality of resource-monitoring tags and resource-control tags in a mapping table of an input-output memory management unit (IOMMU).

22. The method of claim 17 further comprising storing a single pair of resource-monitoring and resource-control tags in a register, the single pair of resource-monitoring and resource-control tags to be associated all non-core requestors in a hardware device.

23. A non-transitory machine-readable medium having program code stored thereon which, when executed by a machine, causes the machine to perform operations of:
providing, by one or more resource providers, shared resources to a plurality of core and non-core requestors within a chip multiprocessor, each of the plurality of core and non-core requestors associated with a respective resource-monitoring tag and a resource-control tag;
storing the resource-monitoring tag and the resource-control tag of each of the non-core requestors in a mapping table;
receiving a resource request sent from a first non-core requestor to a first resource provider, the resource request comprising a first address in an address space of the first non-core requestor;
translating the first address to a second address in an address space of the first resource provider;
looking up the resource-monitoring and resource-control tags of the first non-core requestor from the mapping table;
modifying the resource request to replace the first address with the second address and to include the resource-monitoring and resource-control tags of the first non-core requestor to generate a modified resource request;
sending the modified resource request to the first resource provider; and
performing address range check on the second address and tag validation on the resource-monitoring and resource-control tags in the modified resource request to ensure the modified request is proper for the first resource provider; and
using the resource monitoring tag and the resource control tag to count a number of cache lines in use by the first non-core requestor.

24. The non-transitory machine-readable medium of claim 23, wherein the operations further comprise associating the resource-monitoring and resource-control tags of the non-core requestor with a PCIe Bus/Device/Function (B:D:F) address tag that uniquely identifies the non-core requestor.

25. The non-transitory machine-readable medium of claim 23, wherein the operations further comprise associating the resource-monitoring and resource-control tags of the non-core requestor with a physical address space identification (PASID) that uniquely identifies the non-core requestor, the non-core requestor being a compute context in a hardware device.

26. The non-transitory machine-readable medium of claim 23, wherein the operations further comprise modifying the stored resource-control tag associated with the non-core requestor to control a quantity of the shared resources that is available to non-core requestor.

27. The non-transitory machine-readable medium of claim 23, wherein the operations further comprise storing the plurality of resource-monitoring tags and resource-control tags in a mapping table of an input-output memory management unit (IOMMU).

28. The non-transitory machine-readable medium of claim 23, wherein the operations further comprise storing a single pair of resource-monitoring and resource-control tags in a register, the single pair of resource-monitoring and resource-control tags to be associated all non-core requestors in a hardware device.

29. The non-transitory machine-readable medium of claim 23, wherein the resource-monitoring tag comprises a resource monitoring identification (RMID) and the resource-control tag comprises a class of service identification (CLOS).

30. The non-transitory machine-readable medium of claim 23, wherein the operations further comprise:
   tracking a quantity of a shared resource used by one or more core and non-core requestors based on a resource-monitoring tag associated with the one or more core and non-core requestors; and
   limiting the quantity of the shared resource available to the one or more core and non-core requestors based on a resource-control tag associated with the one or more core and non-core requestors.

* * * * *